(12) United States Patent
Bellert

(10) Patent No.: US 10,679,049 B2
(45) Date of Patent: Jun. 9, 2020

(54) IDENTIFYING HAND DRAWN TABLES

(71) Applicant: Konica Minolta Laboratory U.S.A., Inc., San Mateo, CA (US)

(72) Inventor: Darrell Eugene Bellert, Boulder, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 60 days.

(21) Appl. No.: 15/719,981

(22) Filed: Sep. 29, 2017

(65) Prior Publication Data
US 2019/0102619 A1    Apr. 4, 2019

(51) Int. Cl.
| | | |
|---|---|---|
| G06K 9/00 | (2006.01) | |
| G06K 9/32 | (2006.01) | |
| H04N 7/14 | (2006.01) | |
| G06K 9/72 | (2006.01) | |
| H04N 1/387 | (2006.01) | |

(52) U.S. Cl.
CPC ..... G06K 9/00463 (2013.01); G06K 9/00449 (2013.01); G06K 9/3233 (2013.01); G06K 9/72 (2013.01); H04N 1/3873 (2013.01); H04N 7/144 (2013.01)

(58) Field of Classification Search
CPC combination set(s) only.
See application file for complete search history.

(56) References Cited

U.S. PATENT DOCUMENTS

| | | | | |
|---|---|---|---|---|
| 5,101,448 | A * | 3/1992 | Kawachiya | G06F 40/174 382/287 |
| 5,784,487 | A * | 7/1998 | Cooperman | G06K 9/00469 382/112 |
| 9,697,423 | B1 * | 7/2017 | Bellert | G06K 9/00456 |
| 10,083,218 | B1 * | 9/2018 | Bellert | G06F 3/0601 |
| 10,268,920 | B2 * | 4/2019 | Bellert | G06K 9/4676 |
| 2006/0061780 | A1 * | 3/2006 | Chen | G06F 3/0488 358/1.8 |
| 2006/0062475 | A1 * | 3/2006 | Li | G06K 9/00476 382/203 |
| 2007/0140565 | A1 * | 6/2007 | Lin | G06K 9/00416 382/203 |
| 2008/0147712 | A1 * | 6/2008 | Pandya | G06F 16/258 |
| 2009/0195656 | A1 * | 8/2009 | Zhou | G09B 19/00 348/169 |

(Continued)

*Primary Examiner* — Zhiyu Lu
(74) *Attorney, Agent, or Firm* — Osha Liang LLP

(57) ABSTRACT

A method for processing an image including a table is provided. The method includes: identifying a plurality of connected components that form the table; generating a skeleton graph comprising a plurality of edges based on the plurality of connected components; calculating a typesetness score that compares the table to a template table based on the plurality of edges; determining a rotation angle for the table and generating a custom coordinate system for the table based on the rotation angle; identifying a plurality of cells in the table based on the skeleton graph, the typesetness score, and the custom coordinate system; linking each of the plurality of cells based on the plurality of edges and validating a link between the plurality of cells; generating a grid of cells based on the link and comprising the plurality of cells; and exporting the grid as a high-level representation of the table.

19 Claims, 24 Drawing Sheets

(56) References Cited

U.S. PATENT DOCUMENTS

| | | | |
|---|---|---|---|
| 2009/0245645 A1* | 10/2009 | Xing | G06K 9/00422 |
| | | | 382/189 |
| 2009/0245654 A1* | 10/2009 | Xing | G06K 9/00422 |
| | | | 382/203 |
| 2010/0246958 A1* | 9/2010 | Ma | G06K 9/00456 |
| | | | 382/176 |
| 2017/0075505 A1* | 3/2017 | Tijssen | G06F 3/0481 |
| 2017/0148140 A1* | 5/2017 | Bellert | G06K 9/00463 |
| 2017/0344847 A1* | 11/2017 | Bellert | G06K 9/4633 |
| 2017/0351913 A1* | 12/2017 | Chen | G06K 9/00449 |
| 2019/0005352 A1* | 1/2019 | Bellert | G06F 16/287 |

* cited by examiner

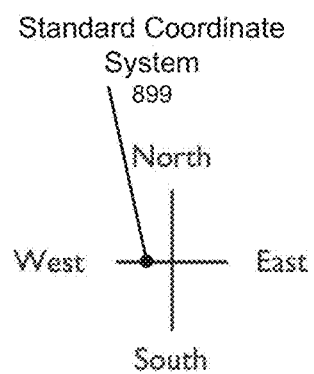
Standard Coordinate System
899
North
West — East
South
FIG. 8A
Image
806
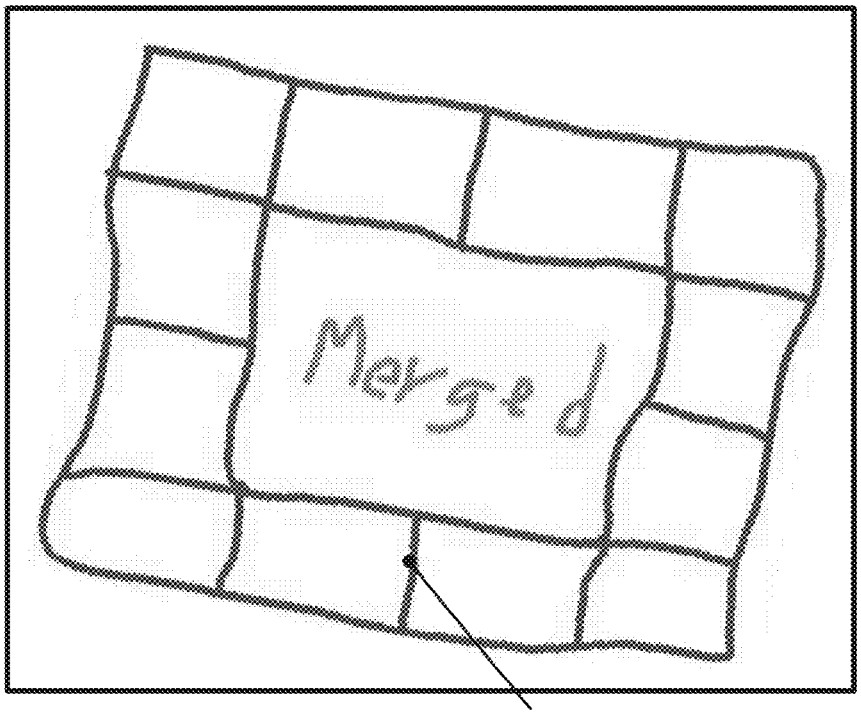
Hand-drawn Table
808
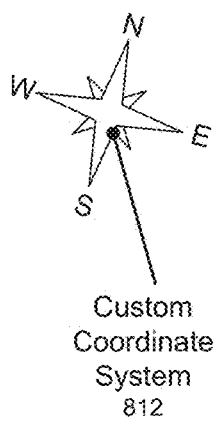
Custom Coordinate System
812
FIG. 8B
Image
(Following conversion to mask)
810
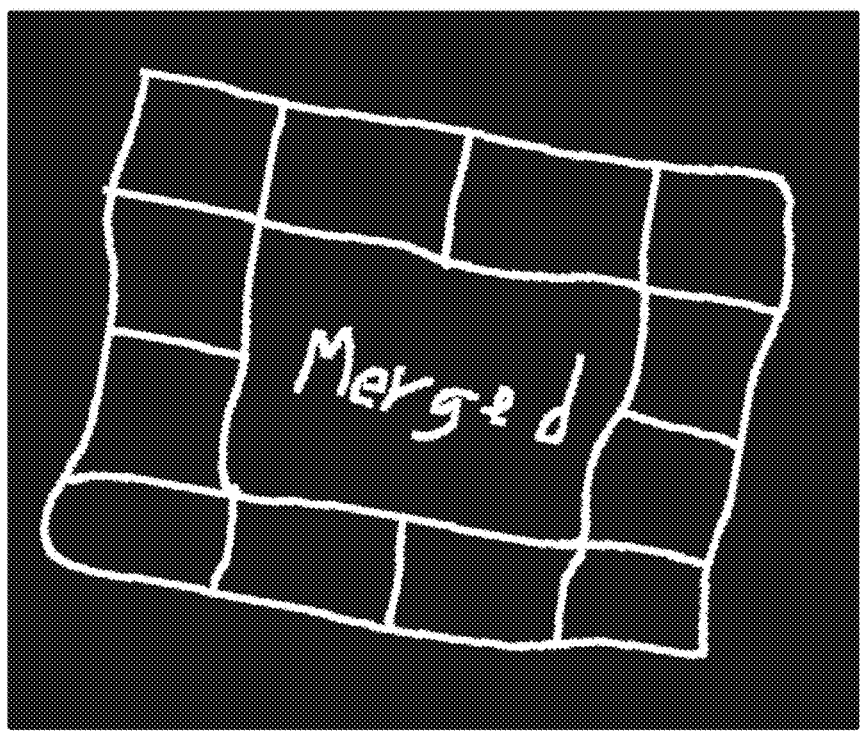

Hand-drawn Table 902

Cluster Lengths 904
Clusters 906
Histogram 903

Imported Table Image
1602

Exported Grid
1604

Imported Table Image
1602

IDENTIFYING HAND DRAWN TABLES

BACKGROUND

An image may include a table with rows and columns bounded by hand-drawn lines. For example, the image may be a scan of a hand-drawn page. These hand-drawn lines are rarely straight, making it difficult for image processing devices to determine the geometry of the table (e.g., upper left corner, extents, number of rows and columns, cell positions). These hand-drawn lines also make it difficult to generate a high-level representation of the table that can be included in an electronic document (e.g., word processing document, spreadsheet, slide show, webpage, etc.). Regardless, users still wish to have image processing devices operate on hand-drawn tables.

SUMMARY

In general, in one aspect, the invention relates to a method for processing an image comprising a table, comprising: identifying a plurality of connected components in the image that form the table; generating, for the table, a skeleton graph comprising a plurality of edges based on the plurality of connected components; calculating a typesetness score that compares the table to a template table based on the plurality of edges; determining a rotation angle for the table and generating a custom coordinate system for the table based on the rotation angle; identifying a plurality of cells in the table based on the skeleton graph, the typesetness score, and the custom coordinate system; linking each of the plurality of cells based on the plurality of edges and validating a link between the plurality of cells; generating a grid of cells based on the link between the plurality of cells and comprising the plurality of cells; and exporting the grid as a high-level representation of the table.

In general, in one aspect, the invention relates to a system for image processing. The system comprises: a memory; and a computer processor connected to the memory that: identifies a plurality of connected components in the image that form the table; generates, for the table, a skeleton graph comprising a plurality of edges based on the plurality of connected components; calculates a typesetness score that compares the table to a template table based on the plurality of edges; determines a rotation angle for the table and generates a custom coordinate system for the table based on the rotation angle; identifies a plurality of cells in the table based on the skeleton graph, the typesetness score, and the custom coordinate system; links each of the plurality of cells based on the plurality of edges and validates a link between the plurality of cells; generates a grid of cells based on the link between the plurality of cells and comprising the plurality of cells; and exports the grid as a high-level representation of the table.

In general, in one aspect, the invention relates to a non-transitory computer readable medium (CRM) storing computer readable code for processing an image comprising a table embodied therein. The program code, when executed: identifies a plurality of connected components in the image that form the table; generates, for the table, a skeleton graph comprising a plurality of edges based on the plurality of connected components; calculates a typesetness score that compares the table to a template table based on the plurality of edges; determines a rotation angle for the table and generates a custom coordinate system for the table based on the rotation angle; identifies a plurality of cells in the table based on the skeleton graph, the typesetness score, and the custom coordinate system; links each of the plurality of cells based on the plurality of edges and validates a link between the plurality of cells; generates a grid of cells based on the link between the plurality of cells and comprising the plurality of cells; and exports the grid as a high-level representation of the table.

Other aspects of the invention will be apparent from the following description and the appended claims.

BRIEF DESCRIPTION OF DRAWINGS

FIGS. 8A-8C show an implementation example in accordance with one or more embodiments of the invention.

DETAILED DESCRIPTION

Figure 1:
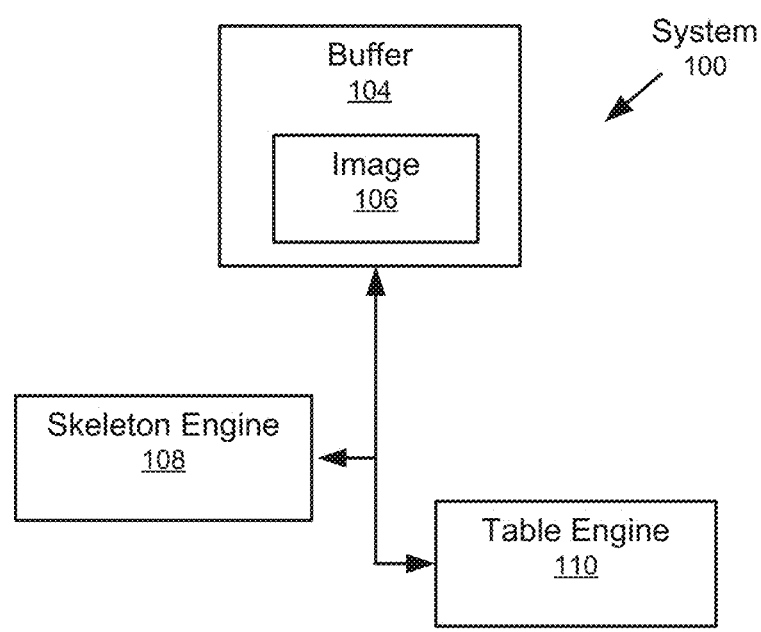
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, a non-transitory computer readable medium (CRM), and a system for image processing. An image including a table with hand-drawn lines is obtained and converted into a mask, and a skeleton graph that includes edges and vertices representing the table is generated. One or more processes are executed on the skeleton graph to identify the table in the image in order to generate a high-level representation of the table for inclusion in an electronic document (e.g., OOXML document, PDF document, etc.).

FIG. 1 shows a system (100) in accordance with one or more embodiments of the invention. As shown in FIG. 1, the system (100) has multiple components, including, for example, a buffer (104), a skeleton engine (108), and a table engine (110). Each of these components (104, 108, 110) may be located on the same computing device (e.g., personal computer (PC), laptop, tablet PC, smart phone, multifunction printer, kiosk, server, etc.) or on different computing devices connected by a network of any size having wired and/or wireless segments. Each of these components is discussed below.

In one or more embodiments of the invention, the buffer (104) may be implemented in hardware (i.e., circuitry), software, or any combination thereof. The buffer (104) is configured to store an image (106) including a table having any number of rows and columns. Each cell of the table may have text and/or graphics. The image (106) may be obtained (e.g., downloaded, scanned, etc.) from any source. Further, the image (106) may be of any size and in any format (e.g., JPEG, GIF, BMP, PNG, etc.). In one or more embodiments, the image (106) includes a writing board (e.g., blackboard, whiteboard, etc.), and the table is drawn on the writing board with a marker.

In one or more embodiments of the invention, the skeleton engine (108) may be implemented in hardware (i.e., circuitry), software, or any combination thereof. The skeleton engine (108) converts the image (106) to a mask (e.g., a binary image) in order to facilitate the identification of hand-drawn lines in the table and/or text characters in the table.

Those skilled in the art, having the benefit of this detailed description, will appreciate that a standard coordinate system for the image (106) may exist. However, if the hand-drawn table is rotated within the image (106), the axes of this standard coordinate system might not align with the rows and columns of the table. In one or more embodiments of the invention, the skeleton engine (108) establishes a custom coordinate system with perpendicular axes that closely align with the rows and columns of the table in the image (106). Alternatively, the image may be rotated to better align the rows and columns of the table with the standard coordinate system of the image (106).

In one or more embodiments of the invention, the image (106) includes one or more connected components. Each connected component may be a portion of the image (106) that can be drawn without lifting the pen/marker. For example, all the lines that form the rows and columns of the table may correspond to a connected component. As another example, only a subset of the lines that form the rows and columns of the table may correspond to a connected component (i.e., the table may be formed of multiple connected components). As yet another example, the content (e.g., text characters) within one cell of the table may form one or more connected components.

In one or more embodiments, the skeleton engine (108) generates a skeleton graph for all identified connected components. Alternatively, the skeleton engine (108) generates the skeleton graph only for the largest connected component (i.e., the connected component with the largest number of pixels) and subsequently generates skeleton graphs for smaller connected components when they are determined as potentially useful in repairing the table. This saves computing resources by avoiding the generation of skeleton graphs for portions of the table that are not necessary for repairing the table.

In one or more embodiments, the largest connected component may corresponds to the entire table. Alternatively, the largest connected component may only correspond to a portion of the table.

In one or more embodiments, a skeleton graph includes a series of edges and vertices. Each edge may correspond to a stroke, or a portion of a stroke, of the table. Each vertex may correspond to an intersection of two or more edges. Further, an edge may contain a path of pixels from one end of the stroke to the other end of the stroke, located approximately at the center of the stroke. The width of a path is one or more pixels.

In one or more embodiments, the skeleton engine (108) also identifies an angle for each edge and the length of each edge. The length of an edge may be calculated as the Euclidean distance between the two terminal ends of the edge. Additionally or alternatively, the length may also be identified by counting the number of pixels within the edge's path of pixels. The angle of an edge may be calculated as the angle between an axis (e.g., x-axis, y-axis, etc.) of the custom coordinate system and/or the standard coordinate system and a line that passes through the two terminal ends of the edge. In one or more embodiments of the invention, the angle of an edge may be rounded to the nearest degree between the range of 0 degrees to 179 degrees.

In one or more embodiments of the invention, if the end of an edge is not connected to another edge, the pixel(s) at the end of the edge is referred to as a terminal vertex. In one or more embodiments of the invention, the intersection of only three edges is referred to as a T-intersection. The pixel(s) at the intersection of the three edges is also referred to as a terminal vertex.

In one or more embodiments of the invention, the table engine (110) may be implemented in hardware (i.e., circuitry), software, or any combination thereof. The table engine (110) is configured to detect the cells in the table. In other words, the table engine (110) is configured to identify the cells of the table in order to generate a high-level representation of the hand-drawn table for inclusion in an electronic document (e.g., an OOXML document, a PDF document, etc.).

In one or more embodiments of the invention, the table engine (110) calculates a typesetness score for the table. The typesetness score for the table is calculated based on the length and angle of each edge. The typesetness score is a measure of how closely the hand-drawn table resembles a template table (e.g., theoretical or ideal table) having rows and columns formed by straight lines with perpendicular intersections. In other words, the typesetness score is a comparison of the table with the template table. For example, the typesetness score may range between 0 and 1, with a typesetness score of 0.98 indicating a near perfect match between the hand-drawn table and the template table. Once calculated, the typesetness score may be used to tighten or loosen certain tolerances in various processes used to generate a high-level representation of the hand-drawn table for inclusion in an electronic document (e.g., an OOXML document, a PDF document, etc.).

One example of a table typesetness score calculation method is described below in reference to FIG. 3. However, the table typesetness score calculation method is not limited to the example described below.

In one or more embodiments of the invention, the table engine (110) executes a table repair method to repair imperfections identified in the table. Specifically, the lines forming the rows and columns of the table may have imperfections. For example, in the case of a table that is drawn using a marker, the imperfections may be dropouts (i.e., disconnections between or within the lines of the table) caused by sloppy drawing and/or caused by the fading of the marker. The table engine (110) determines portions of the table that can be repaired through the addition of artificial edges based on the edges and vertices of the skeleton graph. For example, an artificial edge can be built between two positions (e.g., pixels) on the skeleton graph to establish a near linear connection, a near perpendicular connection, or a corner connection. By repairing the table, it is more likely that the additional processes that operate on the table will be able to correctly generate a high-level representation of the table for inclusion in the electronic document (e.g. OOXML document, PDF document, etc.).

One example of a table repair method is described below in reference to FIGS. 4A and 4B. However, the repair method is not limited to the example described below.

In one or more embodiments of the invention, the table engine (110) executes a table cell detection method to identify one or more cells that make up the table. Initially candidate cells are identified from the skeleton graph. The candidate cells are composed of edges and vertices. Then one or more validation processes are executed on each candidate cell to confirm the candidate cell is actually a cell of the table. In one or more embodiments, the table engine (110) stores the validated cells in a validated cells data structure (e.g., array, list). With these edges and vertices of the candidate cell(s) identified and validated, a high-level representation of the table may be generated for inclusion in the electronic document (e.g., OOXML document, PDF document, etc.).

Examples of a table cell detection method and a table cell validation method are described below in reference to FIGS. 5A-5C and FIGS. 6A-6C, respectively. However, the table cell detection and validation methods are not limited to the examples described below.

In one or more embodiments of the invention, the table engine (110) may execute one or more methods, after identifying and validating the cells in the table, to remove interior cells in the skeleton graph. In one or more embodiments, an interior cell is a cell that shares at least one edge with another cell, overlaps in area with another cell, and has a size (e.g. area) that is smaller than the other cell (i.e., each interior cell is contained within a larger cell). The table engine (110) identifies interior cells by tracing all of the cells stored in the validated cells data structure (e.g., array, list) to identify one or more edges shared by two cells (i.e., the shared edge) in a same clockwise or counter-clockwise direction. This will be described in more detail below in FIG. 13.

In one or more embodiments of the invention, the table engine (110) may execute one or more methods, after removing interior cells in the table, to link the cells that make up the table. In one or more embodiments, the table engine (110) links the cells by identifying shared edges (i.e., edges that are shared by one or more cells) between cells during a clockwise or counter-clockwise trace of the cells stored in the validated cells data structure. The table engine (110) further classifies a cell that shares an edge with another cell as a neighboring cell in a cardinal direction of the custom coordinate system. For example, assume that a NORTH edge (i.e., an edge in the northern border) of cell A is an edge shared with cell B. The table engine (110) will record cell B as a northern neighbor of cell A and cell A as a southern neighbor of cell B. In one or more embodiments, a cell may have more than one neighboring cell (e.g., northern neighbor, southern neighbor, eastern neighbor, and western neighbor). In one or more embodiments, the table engine (110) stores all of the neighboring cell information in a neighboring cell data structure (e.g., array) and uses the information of the neighbor cells to create a link between all of the cells stored in the validated cells data structure (i.e., to establish a link between all of the cells in the table). This is described in more detail below in FIG. 14.

In one or more embodiments of the invention, the table engine (110) may execute one or more methods, after linking all of the cells that make up the table, to validate the link between the cells in the table. In one or more embodiments, to validate a link between two cells, the table engine (110) designates one of two cells as a current cell, and the other cell is designated as a neighbor cell. The table engine (110) validates a link between two cells when the neighbor cell is confirmed as a cell that is stored in the validated cell data structure, and when the current cell is confirmed as a cell that is listed in the neighbor cell data structure (e.g., array) as the neighboring cell of the neighbor cell. For example, assume Cell X and Cell Y are neighboring cells. Further assume that Cell X is selected as the current cell and Cell Y is selected as the neighbor cell. The table engine (110) validates that Cell Y is a cell listed in the validated cell data structure and that Cell X is listed in the neighboring cell data structure as a neighboring cell of Cell Y.

In one or more embodiments of the invention, the table engine (110) executes a merged cell splitting method to split one or more merged cells identified in the table. Specifically, the obtained image may contain a table with one or more merged cells (discussed below in FIGS. 7A-7C). One or more processes are executed by the table engine (110) on the skeleton graph to recreate the table after the splitting of the merged cells. These one or more processes may add artificial edges to the skeleton graph, where each artificial edge corresponds to the border of a cell(s) after the splitting. With the original (i.e., pre-merging) borders known, a high-level representation of the table may be generated for inclusion in the electronic document (e.g., OOXML document, PDF document, etc.). The high-level representation may have attributes and/or tags for each cell, even cells that have been merged with other cells. When the electronic document is rendered (e.g., displayed, printed) the new (post-splitting) table may be visible and/or the pre-splitting table (i.e., the table as it appears in the obtained image) may be visible.

One example of a merged cell splitting method is described below in reference to FIGS. 7A-7C. However, the table merged cell splitting method is not limited to the example described below In one or more embodiments of the invention, the table engine (110) may execute one or more processes to generate and export a grid of cells. In one or more embodiments, the table engine (110) builds a largest quadrilateral (e.g., square or rectangular) grid using all of the cells in the table, after the merged cells have been split, to identify the largest possible table formed by the split cells. This ensures that the table engine (110) will identify the largest possible table from the set of cells and return the most data that could be found in the event that any cells were missed in the above described processes executed by the table engine (110). In one or more embodiments, the table engine (110) exports the grid as a high-level representation of the table having attributes (e.g., number of cells, number of rows, number of columns, row heights, column widths, etc.) specified within one or more tags.

Although the system (100) is shown as having three components (104, 108, 110), in other embodiments of the invention, the system (100) may have more or fewer components. Further, the functionality of each component described above may be split across components. Further still, each component (104, 108, 110) may be utilized multiple times to carry out an iterative operation.

FIGS. 2-7 show flowcharts in accordance with one or more embodiments of the invention. The flowcharts depict a process for processing an image comprising a table. Specifically, the flowcharts depict a process for identifying a table in the image. One or more of the steps in FIGS. 2-7 may be performed by the components of the system (100), discussed above in reference to FIG. 1. In one or more embodiments of the invention, one or more of the steps shown in FIGS. 2-7 may be omitted, repeated, and/or performed in a different order than the order shown in FIGS. 2-7. Accordingly, the scope of the invention should not be considered limited to the specific arrangement of steps shown in FIGS. 2-7.

Figure 2:
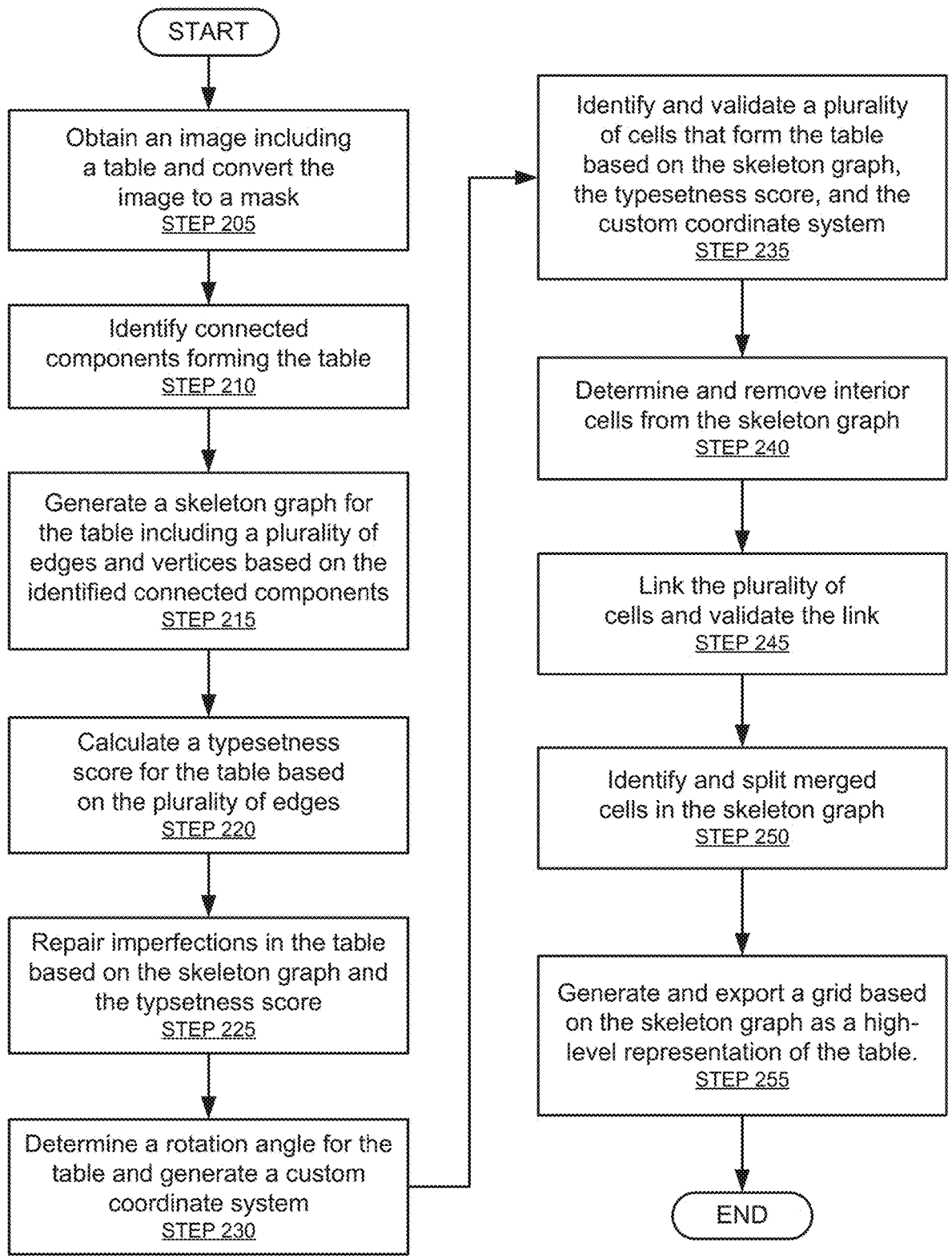
FIG. 2 shows a main flowchart in accordance with one or more embodiments of the invention.

FIG. 2 shows a main flowchart in accordance with one or more embodiments. Specifically, the main flowchart of FIG. 2 describes most (or all) of the methods executed by the table engine (110), as described above in FIG. 1, to identify a table included in an image.

Initially, an image including a table is obtained (STEP 205). The image may be obtained (e.g., downloaded, scanned, etc.) from any source and may be of any size or format. For example, the image may include a writing board and the table is hand-drawn on the writing board. Additionally or alternatively, the image may be a scan of a hardcopy document, where the table is visible in the hardcopy document and the table was computer-generated. Due to the nature of strokes drawn by hand and/or errors introduced during the scanning process, the rows and columns of the table are unlikely to be bounded by perfectly straight strokes. In one or more embodiments, the table may include one or more merged cells (discussed below in reference to FIGS. 7A-7C).

In one or more embodiments of the invention, the image is converted into a mask (e.g., a binary image) to identify each hand-drawn line of the table and/or text characters in the table. Pixels corresponding to the strokes of the table may be set to 1, while all remaining pixels are set to 0. Further, the custom coordinate system as described above in reference to FIG. 1 is established for the table. Alternatively, the table may be rotated to better align the rows and columns of the table with the standard coordinate system of the image.

In STEP 210, all connected components in the table are identified, as described above in reference to FIG. 1. In STEP 215, a skeleton graph, as discussed above in reference to FIG. 1, is generated for the table. In one or more embodiments of the invention, a skeleton graph is generated for all connected components identified in STEP 210. Alternatively, the skeleton graph is generated for only the largest connected component identified in STEP 210.

In one or more embodiments of the invention, as described above in reference to FIG. 1, the skeleton graph may include sets of edges and vertices that represent the table. Each edge may correspond to a stroke, or a portion of a stroke, of the table and each vertex may correspond to an intersection of two or more edges. In other words, the vertices separate edges.

In STEP 220, a typesetness score, as discussed above in FIG. 1, is calculated for the table.

In STEP 225, as discussed above in FIG. 1, imperfections in the table are identified and repaired based on the skeleton graph and the typesetness score of the table.

In STEP 230, a rotation angle is determined for the table and the custom coordinate system, as discussed above in FIG. 1, is generated for the table to be aligned with the rows and columns of the table.

In STEP 235, a plurality of cells that make up the table are identified and validated, as discussed above in FIG. 1, based on the edges and vertices of the skeleton graph, the typesetness score of the table, and the custom coordinate system.

In STEP 240, interior cells, as discussed above in FIG. 1, are identified and removed from the skeleton graph.

In STEP 245, a link is established, after the removal of interior cells, between the plurality of cells that are validated in STEP 235, and the link between the cells is validated.

In STEP 250, merged cells (discussed below in reference to FIGS. 7A-7C) in the table are identified and split.

In STEP 255, a grid of cells, as discussed above in FIG. 1, is generated for the table and exported as a high-level representation of the table.

Figure 3:
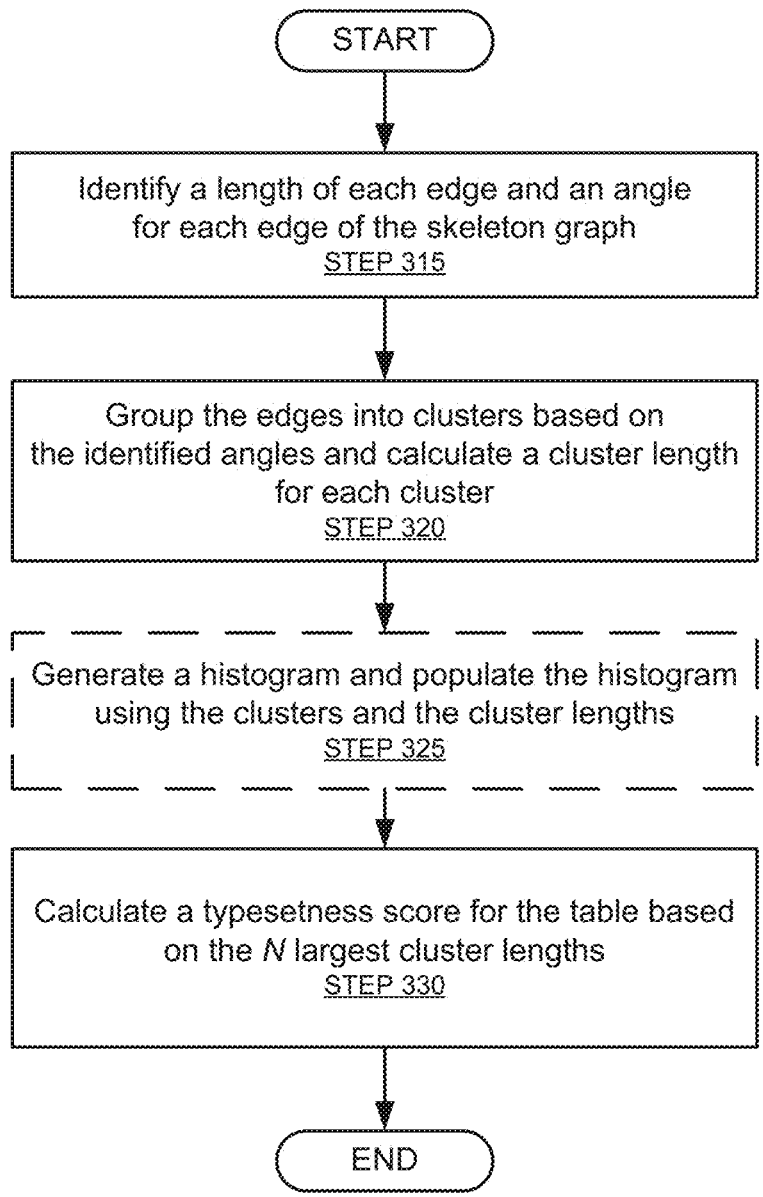
FIG. 3 shows a sub-flowchart in accordance with one or more embodiments of the invention.

FIG. 3 shows a sub-flowchart in accordance with one or more embodiments. FIG. 3 provides additional details regarding STEP 220 of the flow chart of FIG. 2. The sub-flowchart of FIG. 3 depicts, at least in part, one example of a table typesetness score calculation method.

In STEP 315, an angle and the length of each edge in the skeleton graph are identified. The length of an edge may correspond to the Euclidean distance between the terminal ends of the edge. The angle of the edge may correspond to the angle between an axis (e.g., x-axis, y-axis, etc.) and a line that passes through both terminal ends of the edge.

In STEP 320, the edges are grouped into clusters based on their angles (e.g., angle bins). For example, all edges with angles between 2 degrees and 3 degrees may be grouped into the same cluster. As another example, all edges with angles between 89.5 degrees and 90.5 degrees may be grouped into the same cluster. Then, a cluster length for each cluster is calculated. For example, assume a cluster has edges: $E_1$, $E_2$, $E_3$, ..., $E_K$. The cluster length for the cluster would be calculated as length of $E_1$+length of $E_2$+length of $E_3$+ ... +length of $E_K$.

In STEP 325, a histogram is generated and populated with the clusters on one axis and the cluster lengths on the other axis. In one or more embodiments, STEP 325 is optional. The histogram provides a visual representation to a user of how close the table is to the template table.

In STEP 330, a typesetness score for the table is calculated using cluster lengths and the total sum of all lengths of all edges. Specifically, the typesetness score may be a ratio of the N largest cluster lengths to the total sum. If N=2, typesetness score=$(CL_1+CL_2)$/(total sum of all lengths of all edges), wherein $CL_1$ and $CL_2$ are the two largest cluster lengths.

Those skilled in the art, having the benefit of this detailed description, will appreciate that if the hand-drawn table closely resembles the template table (i.e., a theoretical table with perfectly straight lines that intersect at 90 degrees), most of the edges will have an angle of 0 degrees or 90 degrees. Accordingly, the cluster that includes zero degrees and the cluster that includes 90 degrees will have the largest cluster lengths. Moreover, since these two clusters include most (possibly all) of the edges, the sum of the cluster lengths for these two clusters will almost equal the sum of all lengths of all edges. Thus, the typesetness score will be close to 1 for such a table.

Although not shown in FIG. 3, following STEP 330, the typesetness score may be used to adjust various tolerances in the various processes that generate a high-level representation of the table for inclusion in an electronic document (e.g., OOXML document, PDF document, etc.).

Figure 4A:
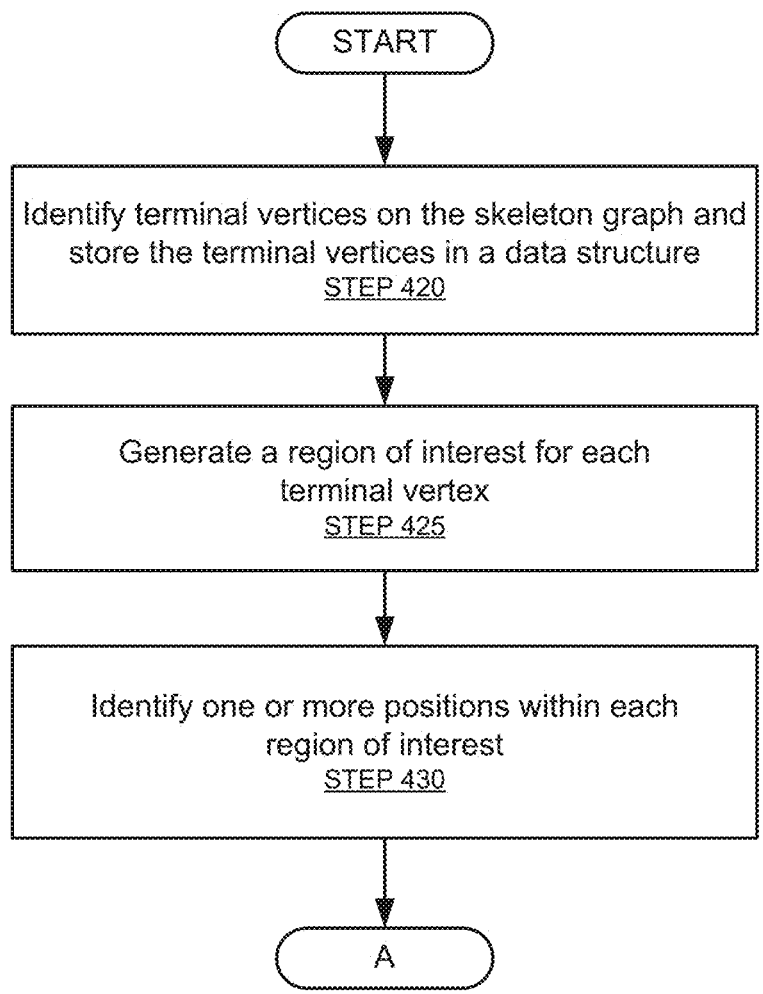
FIGS. 4A and 4B show a sub-flowchart in accordance with one or more embodiments of the invention.
Figure 4B:
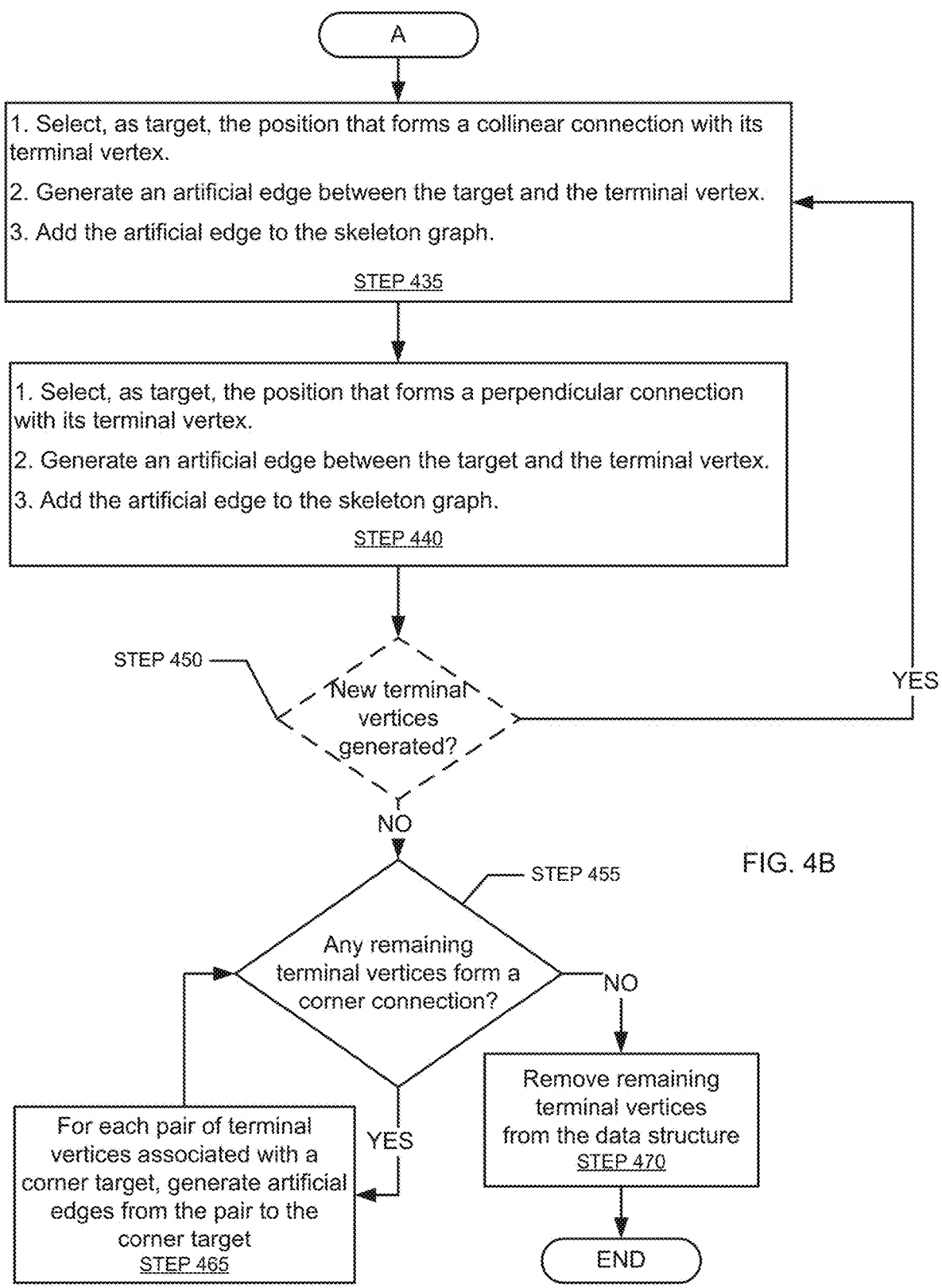

FIGS. 4A and 4B show a sub-flowchart in accordance with one or more embodiments. FIG. 4A and FIG. 4B provide additional details regarding STEP 225 of the flow chart of FIG. 2. The sub-flowchart in FIG. 4A and FIG. 4B depicts, at least in part, one example of a table repair method.

In STEP 420, a plurality of terminal vertices are identified on the skeleton graph and stored in a data structure (e.g., array). Specifically, in one or more embodiments, if the end of an edge is not connected to another edge, the pixel(s) at the end of the edge is identified as a terminal vertex. In one or more embodiments of the invention, the intersection of only three edges is referred to as a T-intersection. The pixel(s) at the intersection of the three edges is also identified as a terminal vertex.

In STEP 425, a region of interest is generated for each of the plurality of terminal vertices. The region of interest may take the shape of a cone, ellipse, triangle, etc. The size and/or shape of the region of interest may depend on how closely the table matches the template table with straight rows and columns. For example, if the table is well-drawn, a smaller size region of interest is suitable.

In STEP 430, multiple positions are identified within the region of interest of each terminal vertex. In one or more embodiments, the positions for each terminal vertex are stored in a data structure (e.g., array) for that terminal vertex.

In one or more embodiments of the invention, collinear connections are preferred over perpendicular connections. Accordingly, in STEP 435, a position that can form a collinear connection with its terminal vertex is selected as the target. Then, an artificial edge between the target and its terminal vertex is generated and added to the skeleton graph. If the artificial edge crosses an intervening edge in the region of interest, and if the artificial edge forms a near perpendicular connection with the intervening edge, then the artificial edge is partitioned into two parts. One part is from the terminal vertex to the intervening edge. The second part is from the intervening edge to the target. The terminal vertex is removed from the data structure storing the terminal vertices. If the target is also a terminal vertex, then it is removed from the data structure storing the terminal vertices. If the target is located on a skeleton graph that is different from the skeleton graph having the terminal vertex, the skeleton graph having the target is added (e.g., combined with) the skeleton graph having the terminal vertex.

In STEP 440, for the remaining terminal vertices, a position that can form a perpendicular connection with its terminal vertex is selected as the target. Then, an artificial edge between the target and its terminal vertex is generated and added to the skeleton graph. If the target is located on a skeleton graph that is different from the skeleton graph having the terminal vertex, the skeleton graph having the target is added (e.g., combined with) the skeleton graph having the terminal vertex.

In one or more embodiments, a terminal vertex that is not connected to a target during STEP 435 or STEP 440 is removed from the data structure storing the terminal vertices.

In STEP 450, a new scan is conducted on the possibly combined skeleton graph to identify new terminal vertices. These new terminal vertices are the result of combining skeleton graphs in STEP 435 and STEP 440.

When it is determined that new terminal vertices exist, the process returns to STEP 435. When it is determined that no new terminal vertices exist, the process proceeds to STEP 455.

In STEP 455, it is determined whether any of the remaining terminal vertices (i.e., terminal vertices that could not form a collinear connection or a perpendicular connection) are able to form a corner connection.

When it is determined that a remaining terminal vertex does not form a corner connection, the terminal vertex is removed, in STEP 470, from the data structure storing the terminal vertices. When it is determined that one or more pairs of remaining terminal vertices can form a corner connection, the process proceeds to STEP 465 to generate artificial edges from the pairs to the corner targets.

Figure 5A:
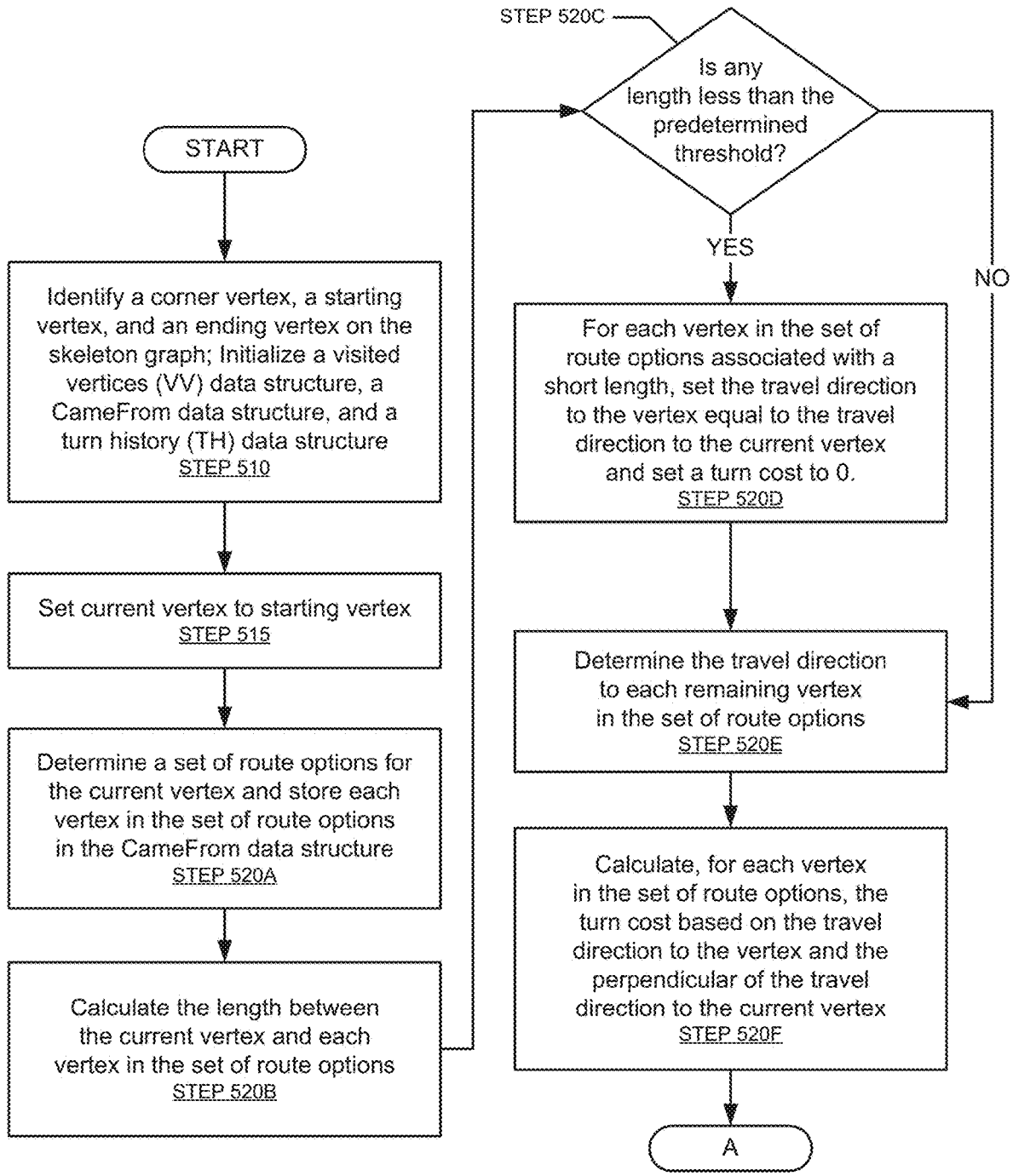
FIGS. 5A-5C show a sub-flowchart in accordance with one or more embodiments of the invention.
Figure 5B:
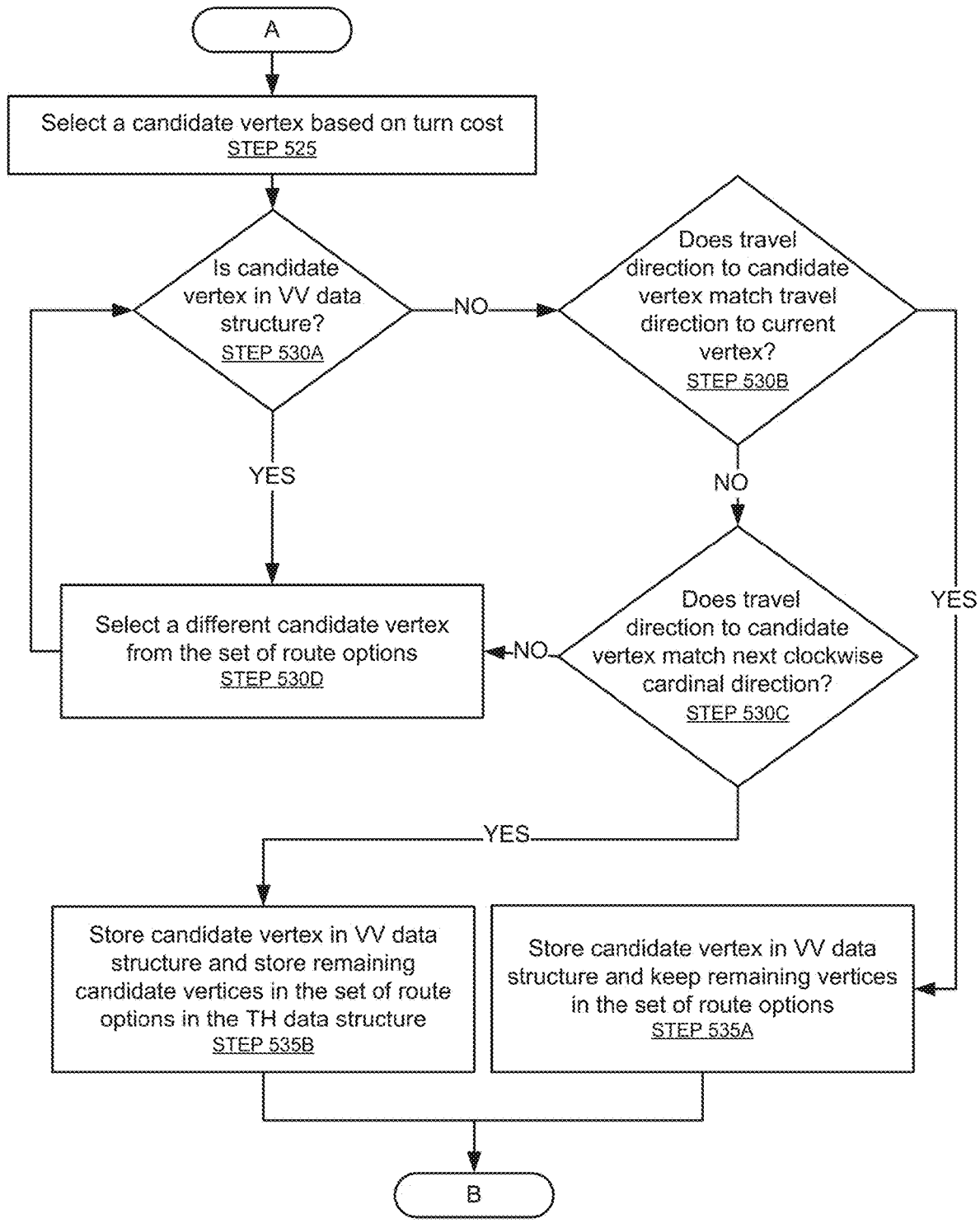
Figure 5C:
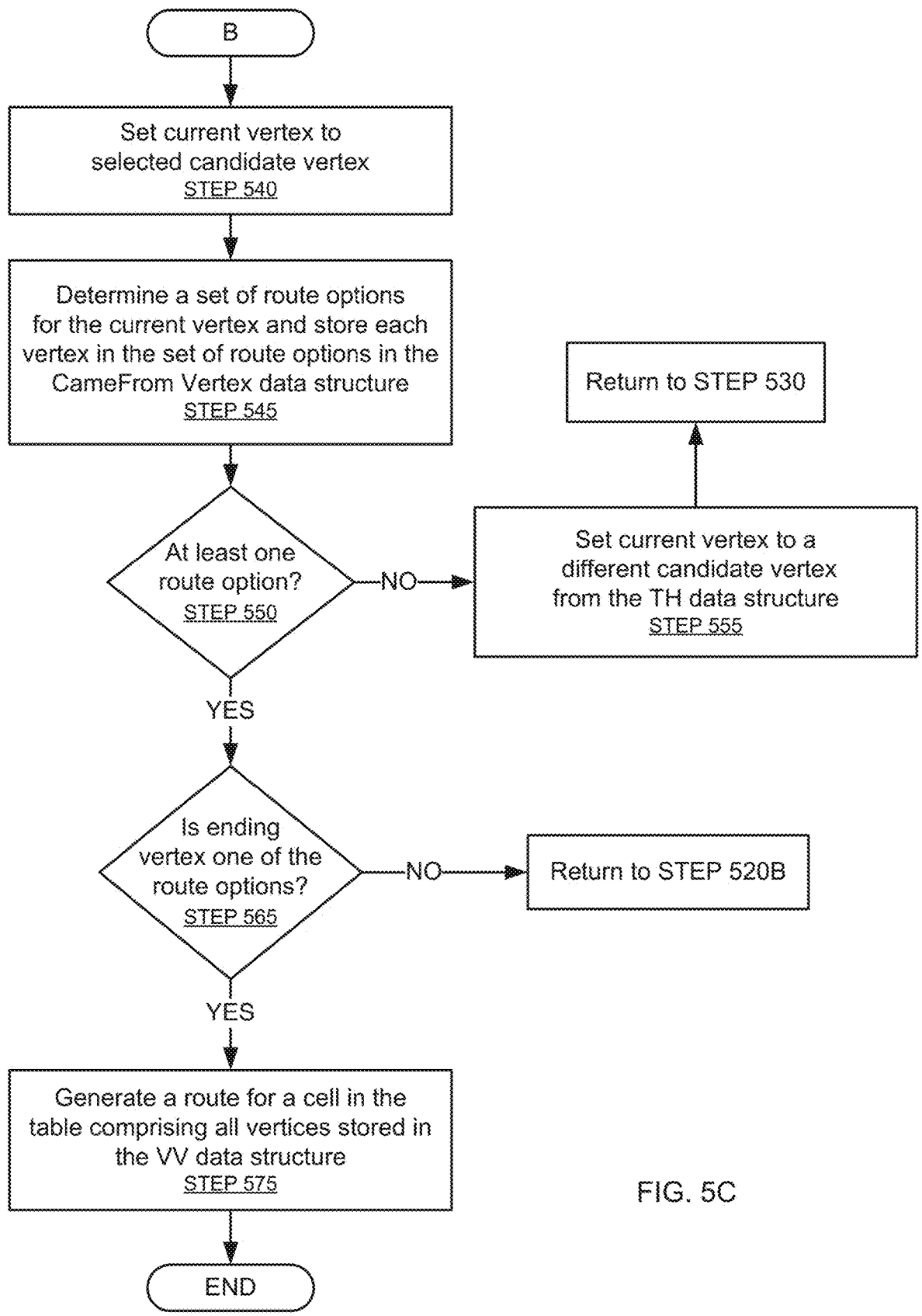

FIGS. 5A-5C show a sub-flowchart in accordance with one or more embodiments. FIGS. 5A-5C provide additional details regarding STEP 235 in the flow chart of FIG. 2. The sub-flowchart in FIG. 5A-5C depicts, at least in part, one example of a table cell detection method that may be used in the main table detection method of one or more embodiments.

In one or more embodiments of the invention, one or more of the steps shown in FIGS. 5A-5C are described based on the initial selection of the clockwise direction of the table with respect to a custom coordinate system. In one or more embodiments, the steps shown in FIGS. 5A-5C may be repeated for the counter clockwise direction.

In STEP 510, a corner vertex, a starting vertex, and an ending vertex, are identified on the skeleton graph. Furthermore, a visited vertices (VV) data structure, a cameFrom data structure, and a turn history (TH) data structure (discussed below in STEP 535B), are initialized. In one or more embodiments of the invention, the corner vertex, the starting vertex, and the ending vertex are stored in the VV data structure.

In one or more embodiments, the corner vertex is a vertex on the skeleton graph that represents an intersection of three or more edges. The starting vertex is separated from the corner vertex by a single edge. The ending vertex is separated from the corner vertex by a single edge. Moreover, the edges starting from the corner vertex and between the starting vertex and the ending vertex are selected such that the edge between the corner vertex and the starting vertex and the edge between the ending vertex and the corner vertex are perpendicular or approximately perpendicular. For example, the edge between the corner vertex and the starting vertex may be in the EAST direction in the custom coordinate system, while the edge between the ending vertex and the corner vertex may be in the NORTH direction in the custom coordinate system.

In one or more embodiments, the VV data structure is used to record all vertices that were selected as candidate vertices (including the corner vertex, the starting vertex, and the ending vertex) during the process to find a rectangular or near rectangular path between the starting vertex and the ending vertex.

In one or more embodiments of the invention, the cameFrom data structure records all of the vertices that were explored (i.e., identified) or selected during the cell detection process and each vertex's preceding vertex. For example, the corner vertex, the ending vertex, and the starting vertex, are populated in the entries of the cameFrom data structure. Because the ending vertex is directly connected to the corner vertex in a counter clockwise direction of the table, the ending vertex is set as the vertex preceding the corner vertex in the entry for the corner vertex in the cameFrom data structure. In one or more embodiments of the invention, the preceding vertex of the ending vertex is set as the ending vertex itself.

In STEP 515, the starting vertex is set to the current vertex.

In STEP 520A, a set of route options (i.e., a set of adjacent vertices) are determined for the current vertex. Each adjacent vertex is separated from the current vertex by a single edge. In one or more embodiments, each adjacent vertex is stored in the cameFrom data structure.

In one or more embodiments, a route options (RO) data structure is initialized to store the set of route options determined for the current vertex. Each entry in the RO data structure includes: one of the adjacent vertices, a current travel vector, a new travel vector, and a turn cost (discussed below). The current travel vector is a travel direction to the current vertex from the vertex preceding the current vertex. The new travel vector is the travel direction from the current vertex to the adjacent vertex. For example, assume that the corner vertex is selected as the current vertex. The RO data structure created for the corner vertex would include one entry with the starting vertex as the vertex that is adjacent to the current vertex. The current travel vector is the direction of travel from the ending vertex to the corner vertex and the new travel vector is the direction of travel from the corner vertex to the starting vertex.

In STEP 520B, the length of each edge (i.e., route) between the current vertex and the adjacent vertices is calculated. In one or more embodiments of the invention, the length of an edge may be calculated as the Euclidean distance between the two terminal ends of the edge. Additionally or alternatively, the length may also be identified by counting the number of pixels within the edge's path of pixels.

In STEP 520C, a determination is made to determine whether there are any edges (i.e., routes) in the set of route options with a length under a predetermined threshold (i.e., a minimum threshold length value). In one or more embodiments, the minimum threshold length value may be computed as twice the average width, in pixels, of all strokes in the table.

In one or more embodiments of the invention, in the event that one of the route options among the set of route options has a length that is shorter than a minimum threshold length value, the new travel vector for the route option is set to be equal to the current travel vector of the route option. Further, the turn cost for the route option is set to 0 (i.e., no calculation required, turn cost is immediately set to 0), which allows noise generated by edges in the skeleton graph that do not meet the minimum threshold length value to be ignored.

When it is determined that one or more adjacent vertices are separated from the current vertex by an edge having a length less than the minimum length threshold (i.e., STEP 520C evaluates to YES), the process proceeds to STEP 520D. In STEP 520D, for each vertex associated with an edge (i.e., route) with a short length, the new travel vector (i.e., the travel direction from the current vertex to the adjacent vertex in the set of route options) is set to be equal to the current travel vector (i.e., the travel direction from the vertex preceding the current vertex on the skeleton graph to the current vertex). Then, the process proceeds to STEP 520E.

In one or more embodiments, the current travel vector is recorded in the format of (x, y), where the (x, y) is the coordinates of the current vertex for the edge between the previous vertex and the current vertex when the edge has been translated such that the previous vertex is at the origin of the custom coordinate system. Similarly, the new travel vector is recorded in the format (x, y), where (x, y) is the coordinates of the adjacent vertex for the edge between the current vertex and an adjacent vertex when the edge has been translated such that the current vertex is at the origin of the custom coordinate system.

When it is determined that all of the adjacent vertices are separated from the current vertex by an edge having a length equaling or exceeding the minimum length threshold (i.e., STEP 520C evaluates to NO), the process proceeds directly to STEP 520E.

In STEP 520E, a new travel vector (i.e., the travel direction from the current vertex to the adjacent vertex in the set of route options) is determined for each vertex in the remaining set of route options (i.e., the adjacent vertices that are separated from the current vertex by an edge equaling or in excess of the minimum length threshold).

In STEP 520F, a turn cost, is calculated for each vertex in the set of route options. In one or more embodiments of the invention, the turn cost is based on the absolute difference between the angle of the new travel vector and the angle of a vector that is perpendicular to the current travel vector and in the next cardinal direction from the direction of the current travel vector. The angle of the perpendicular vector in the next cardinal direction represents the ideal turn direction for the current travel direction (e.g., if the travel direction of the current travel vector is EAST, the ideal turn direction would be 90 degrees to the SOUTH for a clockwise direction). For example, assume an adjacent vertex has a current travel vector (i.e., current travel direction) of (124, −9) and a new travel vector (i.e., new travel direction) of (130, −6). The vector that is perpendicular to the current travel vector and in the next cardinal direction is (9,124) and has an angle of 86 degrees. The angle of the new travel vector (130, −6) is calculated as −3 degrees. The absolute difference between 86 degrees and −3 degrees is 89 degrees, which is set as the turn cost of the vertex.

In one or more embodiments, the turn cost for a route option with a length that is shorter than a minimum threshold length value is set to 0 (i.e., no calculation required, turn cost immediately set to 0).

In STEP 525, the vertex in the set of route options with the lowest turn cost is selected as a candidate vertex.

In STEP 530A, a determination is made to determine whether the candidate vertex selected in STEP 225 matches a vertex stored in the VV data structure. In other words, it is determined whether the candidate vertex is already recorded in the VV data structure. When it is determined that the candidate vertex is already recorded in the VV data structure, the process proceeds to STEP 530D. Otherwise, when it is determined that the candidate vertex is absent from the VV data structure, the process proceeds to STEP 530B.

In STEP 530D, a new (i.e., different) candidate vertex is selected from the remaining vertices in the set of route options. In one or more embodiments of the invention, the new candidate vertex is the vertex among the remaining vertices in the set of route options with the lowest turn cost. In one or more embodiments of the invention, the first candidate vertex selected in STEP 525 is discarded from the set of route options.

In STEP 530B, it is determined whether the new travel direction of the candidate vertex (i.e., the travel direction from the current vertex to the candidate vertex) matches the current travel direction of the candidate vertex (i.e., the travel direction from the vertex preceding the current vertex on the skeleton graph to the current vertex) (e.g., they are both EAST). When it is determined that the new travel direction matches the current travel direction, the process proceeds to STEP 535A. When it is determined that the new travel direction does not match the current travel direction, the process proceeds to STEP 530C.

In STEP 530C, it is determined whether the new travel direction of the candidate vertex (i.e., the travel direction from the current vertex to the candidate vertex) matches the next clockwise cardinal direction of the current travel direction. For example, if the current travel direction is EAST, it is determined whether the new travel direction is SOUTH. As another example, if the current travel direction is NORTH, it is determined whether the next travel direction is EAST. When it is determined that the new travel direction matches the next clockwise cardinal direction of the current travel direction, the process proceeds to STEP 535B. Otherwise, the process proceeds to STEP 530D.

In STEP 535A, the selected candidate vertex is stored in the VV data structure and the remaining vertices in the set of route options are kept in the RO data structure for the next current vertex.

In STEP 535B, the selected candidate vertex is stored in the VV data structure and the remaining vertices in the set of route options are moved to the TH data structure.

In one or more embodiments of the invention, the TH data structure is a stack holding sets of route options. The set of remaining route options that were not selected are pushed onto the TH data structure. The stack of route options stored in the TH data structure may be accessed when the current vertex is determined to be a dead end (i.e., the current vertex has no possible route options) (discussed below in STEP 550).

In STEP 540, the candidate vertex is designated as the new current vertex. In STEP 545, a set of route options (i.e., adjacent vertices) as discussed above in reference to STEP 520A, is determined for the new current vertex and each of the adjacent vertices in the set of route options for the new current vertex is stored in the cameFrom vertex data structure.

In STEP 550, a determination is made to determine if the set of route options for the new current vertex includes at least one route option. In the event that the determination in STEP 550 is NO, the process proceeds to STEP 555 where the top-most set of route options is popped from the TH data structure and a new (i.e., different) candidate vertex is selected from the set. In one or more embodiments of the invention, the new (i.e., different) candidate vertex selected is the vertex with the lowest turn cost among the route options stored in the set. Once a new (i.e., different) candidate vertex is selected, the process returns to STEP 530. In one or more embodiments, the current vertex without any route options is removed from the VV data structure.

In the event that the determination in STEP 550 is YES (i.e., at least one route option exists for the current vertex), the process proceeds to STEP 565 where a determination is made to determine whether the route options (i.e., adjacent vertices) of the new current vertex includes the ending vertex.

In the event that the determination in STEP 565 is NO, the process returns to STEP 520B where the above described steps are repeated for the new current vertex.

In the event that the determination in STEP 565 is YES, the process proceeds to STEP 575 where a route is generated for a cell in the table. In one or more embodiments, the generated route includes all vertices stored in the VV data structure. In one or more embodiments, the data stored in the cameFrom data structure is used to backtrack (i.e., walk backward through) the generated route starting from the current vertex, eventually reaching the starting vertex, then the corner vertex, and ending at the ending vertex.

Figure 6A:
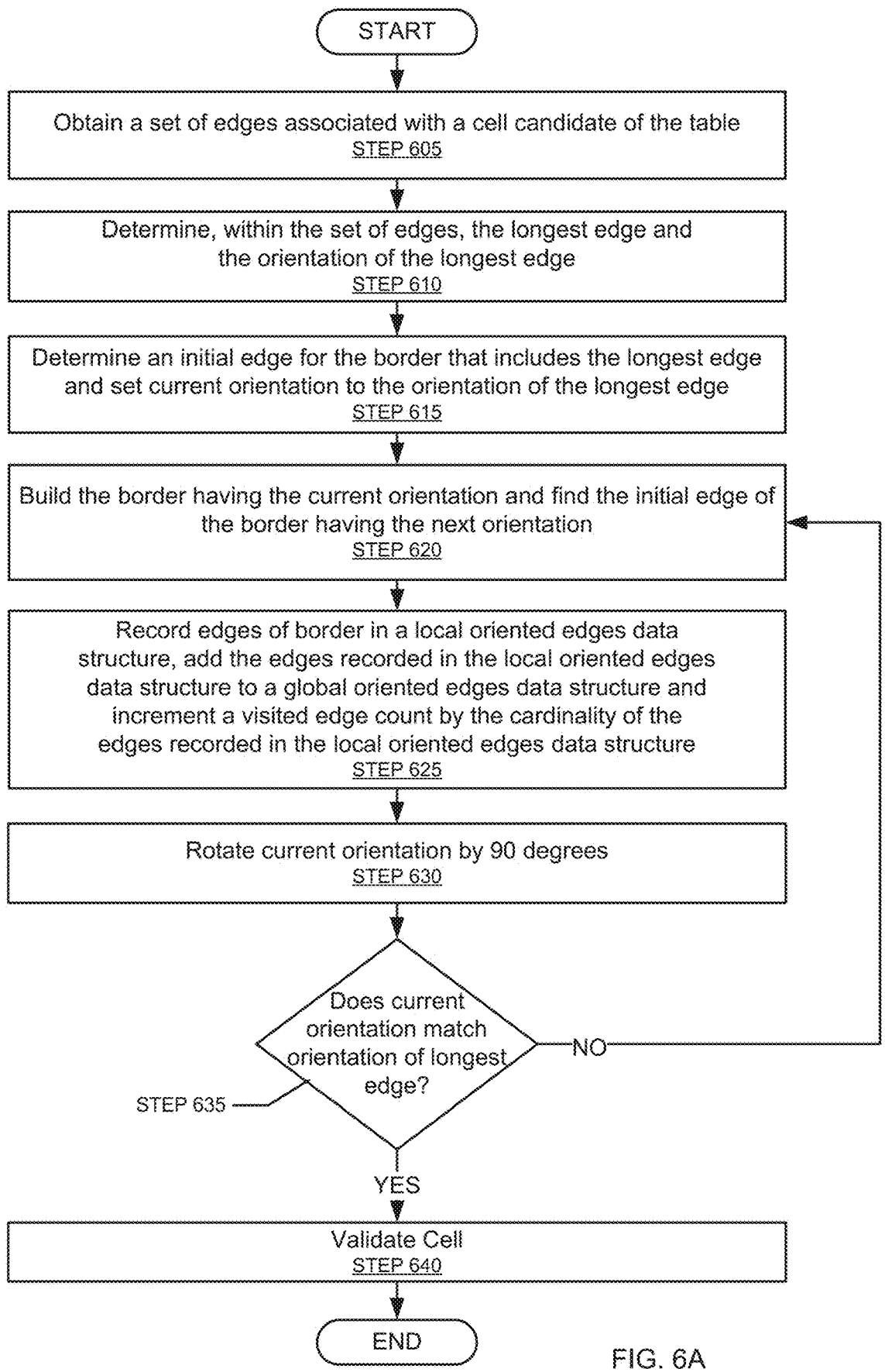
FIGS. 6A-6C show a sub-flowchart in accordance with one or more embodiments of the invention.
Figure 6B:
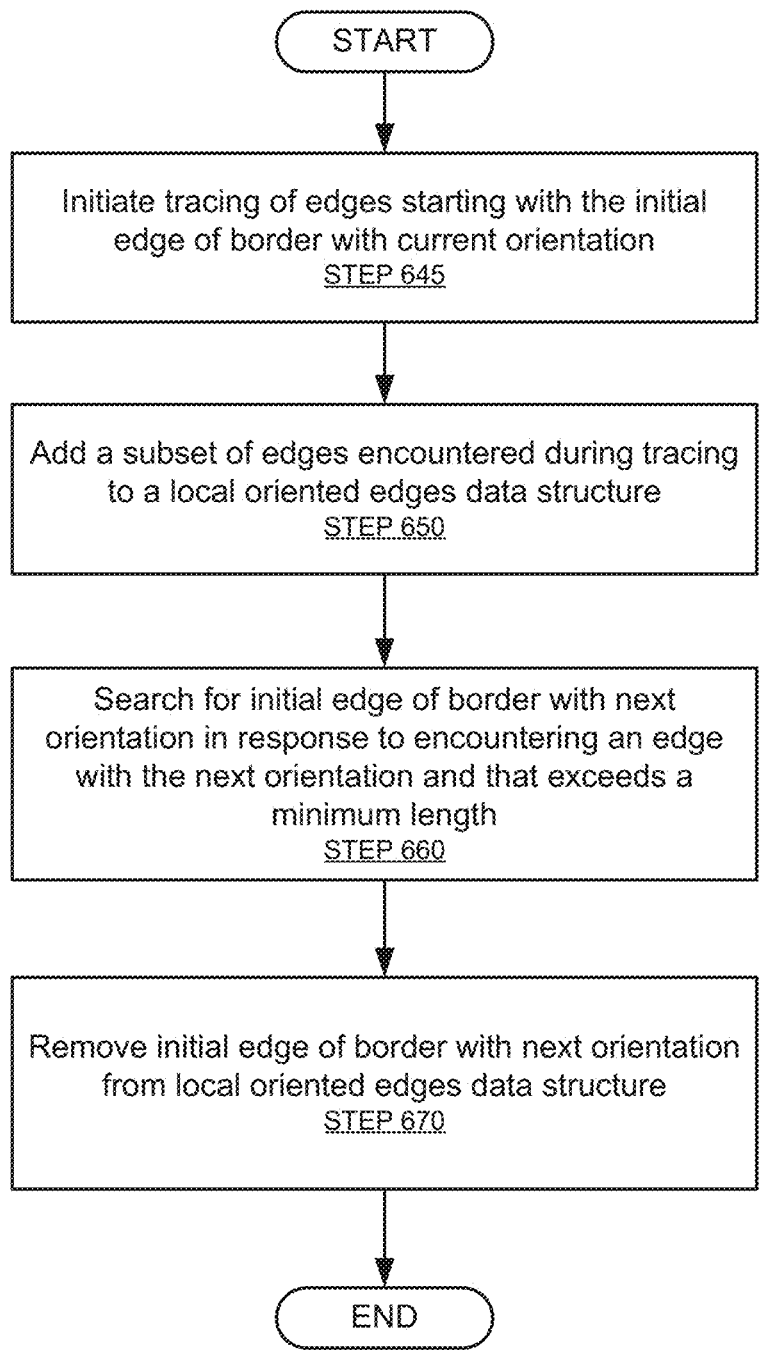
Figure 6C:
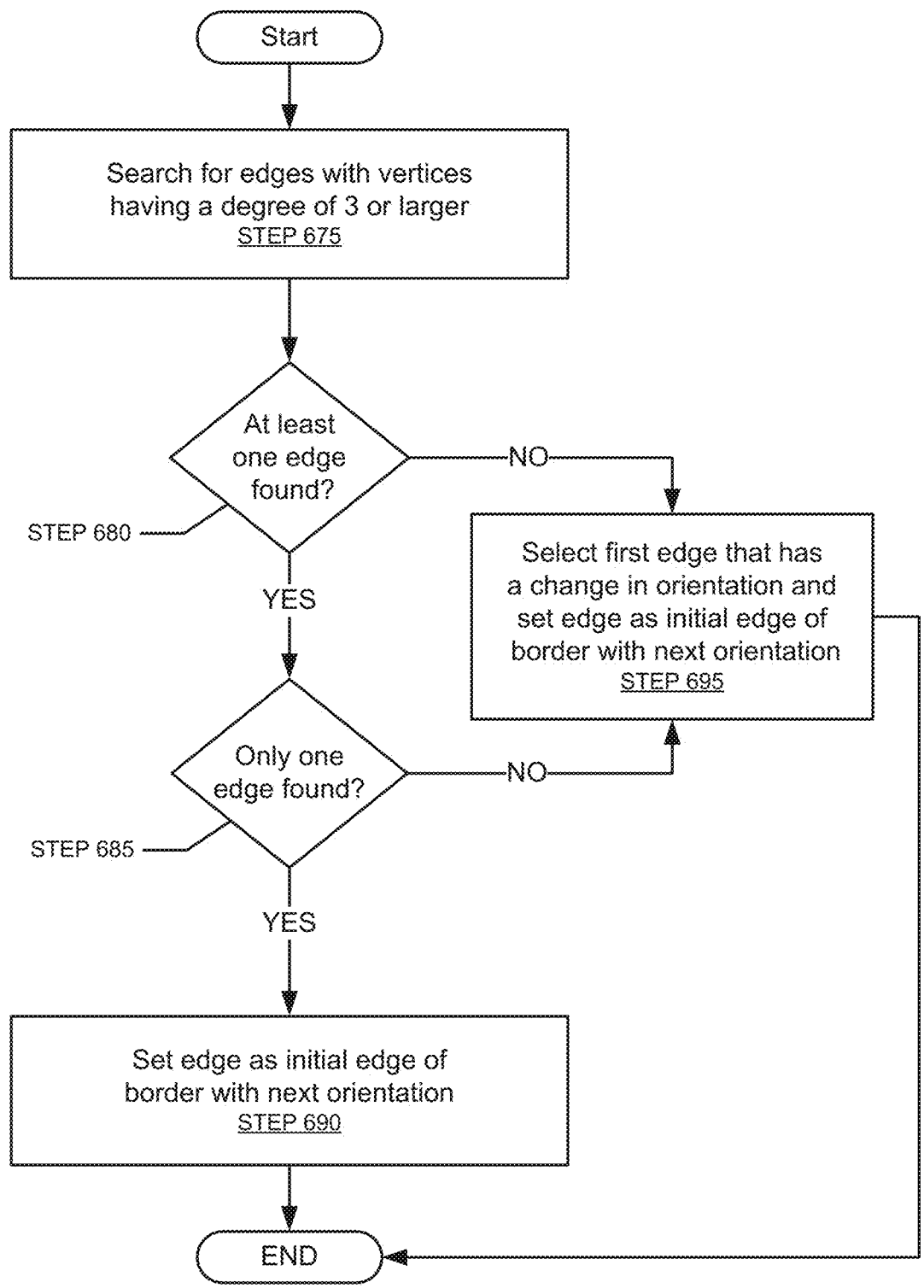

FIGS. 6A-6C show a sub-flowchart in accordance with one or more embodiments. FIGS. 6A-6C provide further detail regarding STEP 235 of the flow chart in FIG. 2. The sub-flowchart depicts, at least in part, one example of a table cell validation method that may be used to validate the table cells that have been detected (e.g., by the table cell detection method as described in FIGS. 5A-5C.)

Instances of clockwise appearing in the below description of FIGS. 6A-6C may be replaced with counter-clockwise, while instances of counter-clockwise may be replaced with clockwise.

Referring to FIG. 6A, initially, in STEP 605, a set of edges associated with a cell candidate is obtained for validation. The set of edges has been identified from a skeleton graph for a table in an image. Each edge may correspond to a stroke, or a portion of a stroke, of the table and each vertex may correspond to an intersection of two or more edges. In other words, the vertices separate edges.

In STEP 610, an edge within the set of edges having the longest length is determined. The orientation of the longest edge is also determined. In one or more embodiments of the invention, the length of an edge may be calculated as the Euclidean distance between the two terminal ends of the edge. Additionally or alternatively, the length may also be identified by counting the number of pixels within the edge's path of pixels. Moreover, the orientation of an edge is determined as the cardinal direction in the custom coordinate system that most closely aligns with the normal of the line segment that joins the endpoints of the edge.

In STEP 615, an initial edge for a border of the cell candidate that includes the longest edge is determined and the orientation of the longest edge is set as a current orientation.

In one or more embodiments, determining the initial edge of the border may include tracing the preceding edges of the longest edge in a direction of the table (i.e., clockwise or counter-clockwise) until finding an edge that exceeds a minimum length threshold and that has an orientation that is +/−90 degrees from the orientation of the longest edge. For example, assume that the longest edge has an orientation of NORTH and the direction of the trace is counter-clockwise. All edges preceding the longest edge are traced in the counter-clockwise direction until an edge that exceeds the minimum length threshold and that has an orientation of WEST is detected. If this edge with an orientation of WEST is a short edge (i.e., an edge shorter than the minimum threshold length value), the tracing resumes until an edge with an orientation of WEST that is longer than the minimum length threshold is detected.

In STEP 620, a border building process is initialized to reconstruct (i.e., build) the border having the current orientation and to find an initial edge of a border having the next orientation in the direction (i.e., clockwise or counter-clockwise) of the border building process. This step is further described in more detail in the flowchart described below in reference to FIG. 6B. Specifically, the output of the border building process is a local oriented edges data structure storing the edges that form the border with the current orientation.

In STEP 625, the edges of the border are recorded in a local oriented edges data structure. The set of edges in the local oriented edges data structure are added to (i.e. recorded in) a global oriented edges data structure for the entire candidate cell. Further, a visited edge count value, which was initialized to zero, is incremented by the cardinality of the edges in the local oriented edges data structure.

In STEP 630, upon the reconstruction of the border with the current orientation, the current orientation is rotated by 90 degrees.

In STEP 635, a determination is made to determine if the current orientation matches the orientation of the longest edge. In the event that the current orientation matches the orientation of the longest edge (i.e., YES for the determination in STEP 635) the border building process has been executed four times and thus has reconstructed all four borders of the candidate cell. In such cases, the process proceeds to STEP 640 where the candidate cell is validated using the edges recorded in the four local oriented edges data structures (i.e., the global oriented edges data structure).

In the event that the determination of STEP 635 is NO, the process returns to STEP 620 until there has been an attempt to reconstruct, by the build border process, all four borders of the candidate cell. As discussed above, execution of the border building process is attempted four times for each candidate cell (i.e., once for each cardinal direction).

FIG. 6B shows a sub-flowchart in accordance with one or more embodiments further expanding upon STEP 620 of the flow chart of FIG. 6A. The sub-flowchart in FIG. 6B depicts, at least in part, the border building process. As discussed above, this process may be executed four times (i.e., once for each cardinal direction) to reconstruct the four borders of the candidate cell.

In STEP 645, a trace of the edges starting with an initial edge of a border with the current orientation is initialized.

In STEP 650, a subset of edges encountered during the tracing of STEP 645 is added to a local oriented edges data structure.

In STEP 660, an edge that exceeds the minimum length threshold and that has the next orientation is encountered during the tracing. In response, a search for the initial edge of the border with the next orientation (i.e., orientation that is +/−90 degrees of the current orientation) is executed. This step is further described in the flowchart described below in reference to FIG. 6C.

In STEP 670, the initial edge of the border with the next orientation (and any other edge having the next orientation) is removed from the local oriented edges data structure. In one or more embodiments, the only edges remaining in the local oriented edges data structure are the edges that make up one border of the candidate cell.

FIG. 6C shows a sub-flowchart in accordance with one or more embodiments further expanding upon STEP 615 of FIG. 6A and STEP 660 of FIG. 6B. The sub-flowchart in FIG. 6C represents, at least in part, the process that searches for an initial edge of a border of a candidate cell (i.e., an edge at the corner of a border of the candidate cell).

In STEP 675, a search for edges with vertices having a degree of 3 or larger is conducted. In one or more embodiments, the edges being searched may be the set of edges stored in the local oriented edges data structure. Additionally or alternatively, the edges may be all edges encountered during the trace after the longest edge was identified.

In STEP 680, a determination is made to determine whether at least one edge with a vertex having a degree of 3 or larger has been identified.

In the event that the determination in STEP 680 is YES, another determination is made in STEP 685 to determine whether only a single edge with a vertex having a degree of 3 or larger was found in STEP 675.

In the event that the determination in STEP 685 is YES (i.e., only one edge with a vertex having a degree of 3 or larger exists), the edge is selected and set as the initial edge of the border with the next orientation.

In the event that the determination in either STEP 680 or STEP 685 is NO, the process proceeds to STEP 695 where the first edge that has a change in orientation is selected as the initial edge of the border with the next orientation.

Figure 7A:
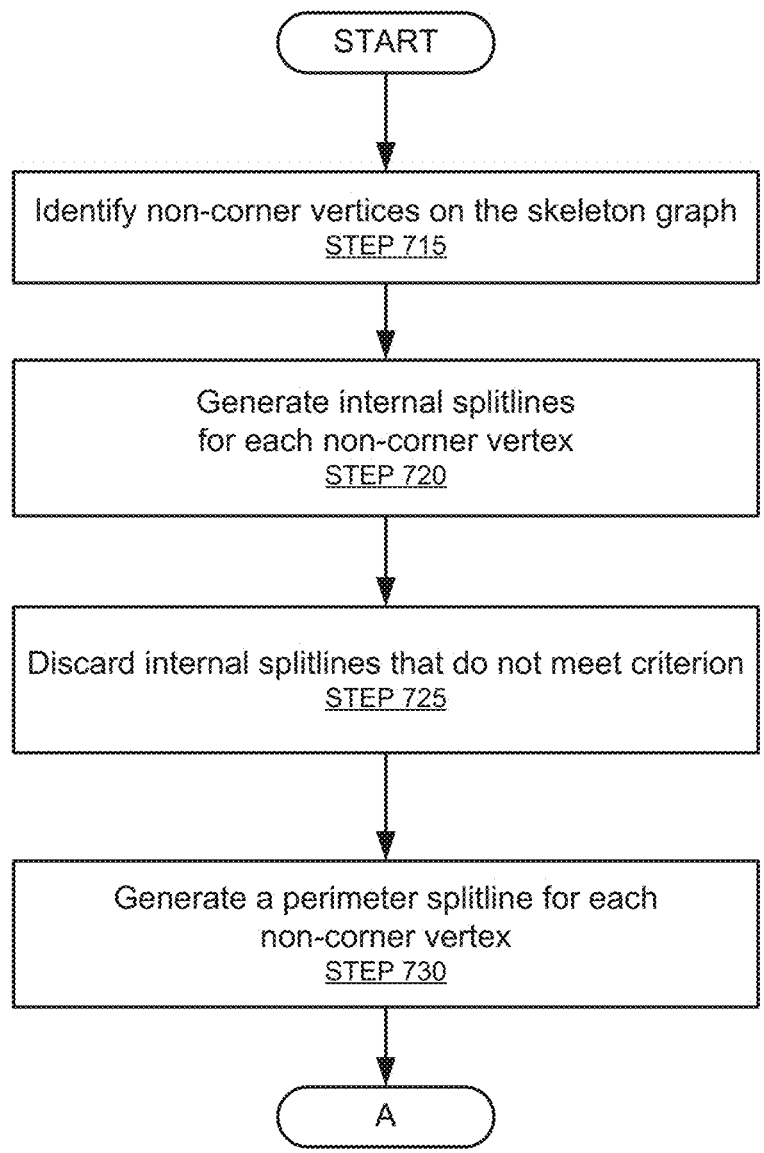
FIGS. 7A-7C show a sub-flowchart in accordance with one or more embodiments of the invention.
Figure 7B:
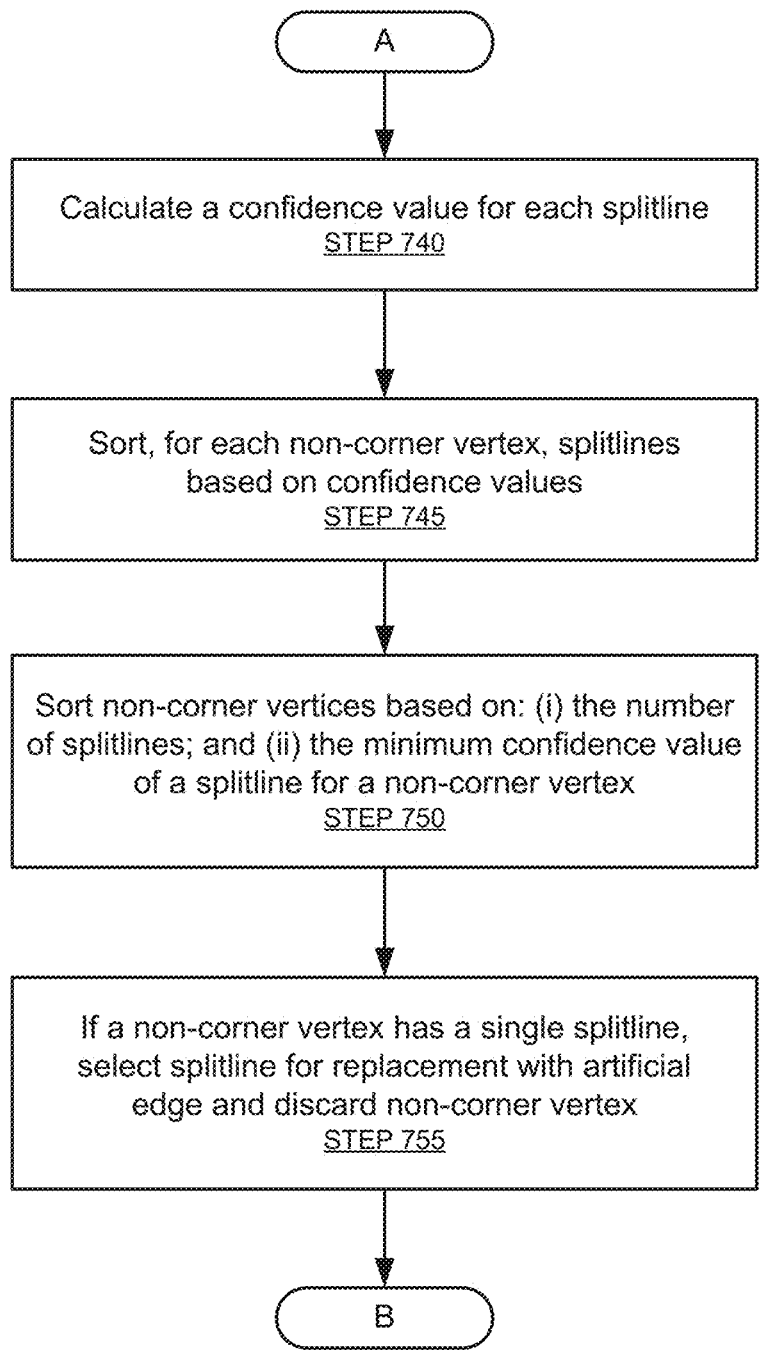
Figure 7C:
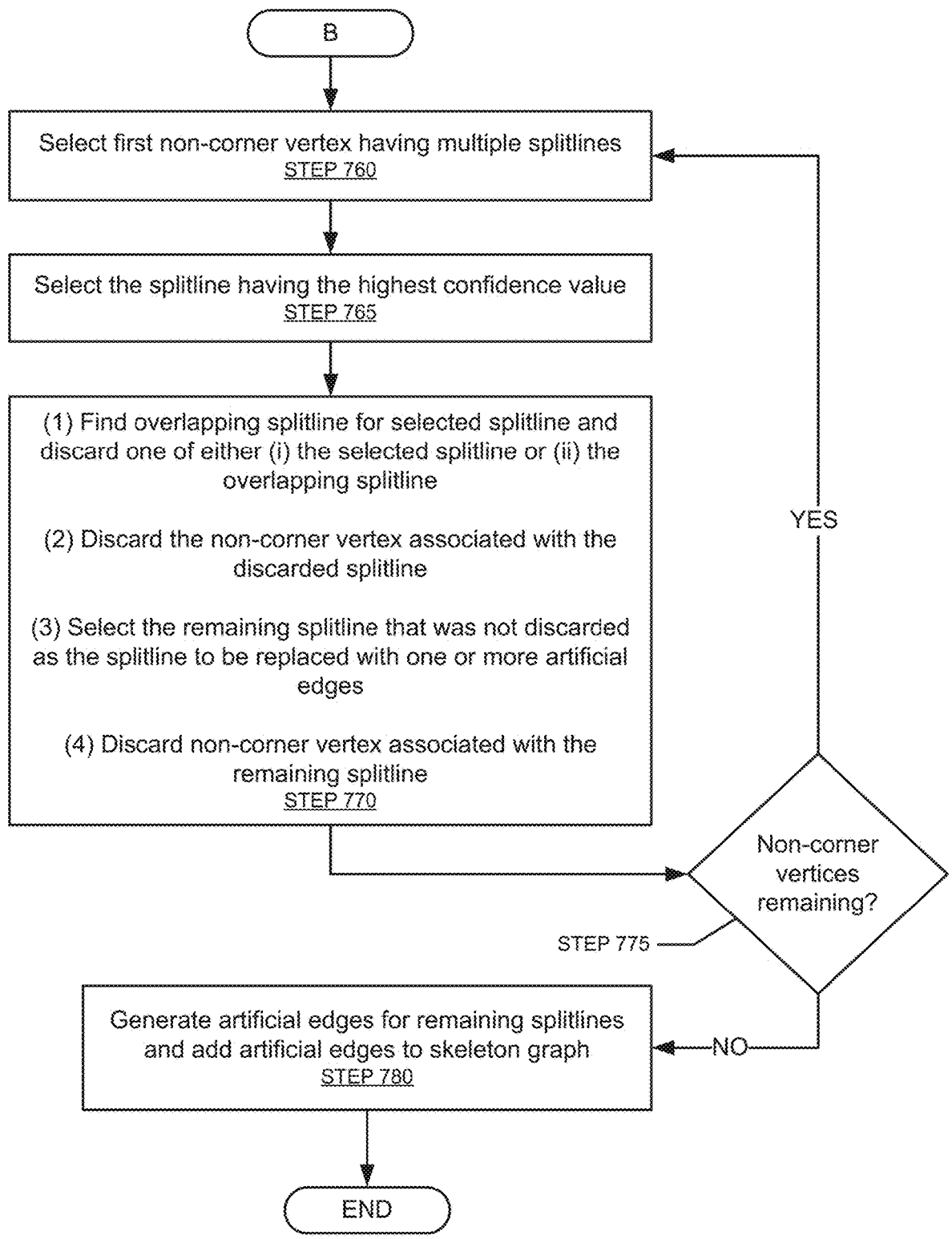

FIGS. 7A-7C show a sub-flowchart in accordance with one or more embodiments. FIGS. 7A-7C show additional detail regarding STEP 250 in the flow chart of FIG. 2. The sub-flowchart depicts, at least in part, one example of a merged cell splitting method that may be used in the main table detection method.

In one or more embodiments of the invention, one or more of the steps shown in FIGS. 7A-7C are described based on the initial selection of the west cardinal direction on the custom coordinate system. In one or more embodiments, the steps shown in FIGS. 7A-7C may be repeated for the north or south cardinal direction.

In STEP 715, all non-corner vertices on the western and eastern borders of the merged cells within the table are identified and stored in a data structure (e.g., array). In one or more embodiments of the invention, a merged cell is a cell that shares one of its borders (e.g., west border) with multiple other cells (i.e., neighbor cells). A border (e.g., south border) of a neighboring cell may intersect (i.e., make contact with) a border of the merged cell (e.g., western border). If this intersection does not occur at a corner of the merged cell, this intersection is referred to as a "non-corner vertex" of the merged cell.

In STEP 720, internal splitlines (i.e., geometric lines that start and terminate at non-corner vertices) are generated for each non-corner vertex identified in STEP 715. For example, if a western non-corner vertex (i.e., a non-corner vertex identified on a western border of a merged cell within the table) is selected, geometric lines are generated between the selected western non-corner vertex and each eastern non-corner vertex in the data structure(s). In one or more embodiments, the number of internal splitlines generated for a non-corner vertex may be zero. For example, if a selected western non-corner vertex does not have any eastern non-corner vertices to connect to, an internal splitline will not be generated for the selected western non-corner vertex.

In STEP 725, internal splitlines that do not meet a criterion are discarded. Specifically, if an internal splitline for a non-corner vertex of a merged cell does not intersect with the opposite border of the merged cell and/or if the internal splitline intersects with an invalid border, the internal splitline is discarded. In one or more embodiments, the invalid border is a border of any cell in the table that is not substantially parallel with the border of the merged cell the non-corner vertex belongs to. In other words, if the border the non-corner vertex belongs to is a vertical border of the merged cell, the internal splitline may not intersect with a horizontal border of any cell in the table. For example, assume there exists a merged cell with a western non-corner vertex. If a splitline from the western non-corner vertex does not intersect with (i.e., cross and/or make contact with) the eastern border of the merged cell and/or if the splitline from the western non-corner vertex intersects with (i.e., crosses and/or makes contact with) a northern or southern border of any cell in the table, the splitline is discarded.

In one or more embodiments of the invention, the remaining internal splitlines that are not discarded in STEP 725 are stored in a data structure referred to as a "possible splitline data structure" (i.e., array). This data structure represents all possible splitlines that may be replaced with one or more artificial edges to split one or more merged cells in the table.

In STEP 730, a perimeter splitline (i.e., a geomantic line that starts at a non-corner vertex and ends at the perimeter of the table) is generated for all non-corner vertices identified in STEP 715. In one or more embodiments, each perimeter splitline travels in the direction of one of the custom cardinal directions and does not intersect with (i.e., cross and/or make contact with) a border of any cell in the table that is not substantially parallel with the border of the merged cell where the perimeter splitline starts. In other words, a perimeter splitline originating from a vertical border of a merged cell may only intersect with (i.e., cross and/or make contact with) vertical borders of the cells in the table as the perimeter splitline travels in the cardinal direction to the perimeter of the table. Specifically, the direction of travel for a perimeter splitline is opposite to the custom cardinal direction of the border where the non-corner vertex is located. For example, in the case of a western non-corner vertex, the perimeter splitline starts at the western non-corner vertex and travels east until reaching the perimeter of the table. In the event that the perimeter splitline intersects with (i.e., crosses and/or makes contact with) a northern or southern border of any cell in the table, the perimeter splitline is not generated. The perimeter splitlines are stored in the possible splitline data structure with the internal splitlines.

In STEP 740, a confidence value, is calculated for each splitline (internal and perimeter) in the possible splitline data structure. The confidence value provides a measure of how closely the splitline corresponds to a theoretical line that splits one or more merged cells.

In one or more embodiments of the invention, the confidence value may be a score ranging from 0 to 1, with 1 being interpreted as the highest score. The confidence value of a splitline is calculated based on the splitline's length. The length of an internal splitline is the Euclidean distance or, alternatively, the number of pixels between the two non-corner vertices. The length of a perimeter splitline is the Euclidean distance, or alternatively, the number of pixels between the non-corner vertex and the point on the perimeter of the table. The shorter the length, the higher the confidence value. For example, a shorter splitline would potentially intersect with (i.e., cross and/or make contact with) less cells and/or characters and texts in the cells of the hand-drawn table and therefore result in a more accurate splitting of the merged cell. As another example, a splitline with a shorter length is more likely to connect two non-corner vertices, which has priority over connecting a non-corner vertex with a point on the hand-drawn table (e.g., a point on the perimeter of the hand-drawn table).

In one or more embodiments of the invention, the confidence value of a splitline is also based on the angle between the splitline's travel direction and the closest axis of the custom coordinate system (i.e., how well the splitline's travel direction matches with the cardinal direction of the custom coordinate system that the splitline is intended to travel). The travel direction of the splitline is the direction of a vector that starts at the non-corner vertex and points away from the non-corner vertex along the direction of the splitline. The closer the angle is to zero, the higher the confidence value.

In STEP 745, the splitlines in the possible splitlines data structure are sorted, for each non-corner vertex, in the order starting from highest confidence value at the front and the smallest confidence value at the back.

In STEP 750, the non-corner vertices in the possible splitline data structure are sorted based on: (i) the number of splitlines and (ii) the minimum confidence value of a splitline for a non-corner vertex. For example, the possible splitline data structure is sorted starting with all non-corner vertices with only a single splitline at the front and the non-corner vertices with the largest number of splitlines at the back. Further, the non-corner vertices with the same number of splitlines are sorted in the order starting from the non-corner vertices with the smallest minimum confidence value at the front to the non-corner vertices with the largest minimum confidence value at the back.

In STEP 755, all non-corner vertices with only a single splitline are selected for replacement with one or more artificial edges and discarded from the possible splitline data structure. These selected splitlines are moved from the possible splitline data structure to another data structure, referred to as a "final splitline data structure." Eventually, one or more artificial edges are generated for each of these splitlines stored in the final splitline data structure and added to the skeleton graph. The artificial edge has the same terminal ends as the splitline it is replacing unless the artificial edge intersects (i.e., crosses) an existing edge of the table. For example, if an existing edge exits between two non-corner vertices or between a non-corner vertex and a point on the perimeter of the table (i.e., if an intervening edge exists between two points on the table to be connected by an artificial edge), a first artificial edge from the first point to the intervening edge will be generated before a second artificial edge from the intervening edge to the second point is generated.

In STEP 760, the first non-corner vertex remaining in the sorted possible splitline data structure is selected. This non-corner vertex will have multiple splitlines.

In STEP 765, the splitline of the non-corner vertex selected in STEP 760 with the highest confidence value is selected.

In STEP 770, if a splitline of a different non-corner vertex overlaps with the splitline selected in STEP 765 and the overlapping splitline has the highest confidence value for the different non-corner vertex, the overlapping splitline of the different non-corner vertex is identified. One of either (i) the splitline selected in STEP 765 or (ii) the splitline of the different non-corner vertex that overlaps with the splitline selected in STEP 765 is discarded from the possible splitline data structure. The non-corner vertex associated with the discarded splitline is also discarded from the possible splitline data structure. The remaining splitline that was not discarded is moved to the final splitline data structure to eventually be replaced with one or more artificial edges. Once the remaining splitline is moved to the final splitline data structure, the non-corner vertex associated with the remaining splitline is discarded from the possible splitline data structure.

For example, assume non-corner vertex A has multiple splitlines: X1, X2, X3. Further, assume non-corner vertex B also has multiple splitlines: Y1, Y2. Now, assume that X2 has the highest confidence value compared with the confidence values of X1 and X3. Also assume that Y1 has the highest confidence value compared with the confidence value of Y2. Finally, assume that X2 and Y1 overlap (i.e., X2 extends from non-corner vertex A to non-corner vertex B, and Y1 extends from non-corner vertex B to non-corner vertex A). Because X2 and Y1 overlap, and because X2 has the highest confidence score for non-corner vertex A while Y1 has the highest confidence score for non-corner vertex B, one of X2 and Y1 is discarded, while the other is replaced with one or more artificial edges. The non-corner vertex associated with the discarded splitline is removed from further consideration, even if this removed non-corner vertex has other splitlines.

In STEP 775, a determination is made to determine whether there are any non-corner vertices remaining in the possible splitline data structure (i.e., if all non-corner vertices in the possible splitline data structure have not been discarded).

In the event that the determination in STEP 775 is YES, the process returns to STEP 760 and repeats until all non-corner vertices in the possible splitline data structure have been discarded.

In the event that the determination in STEP 775 is NO, the process proceeds to STEP 780 where sets of one or more artificial edges are generated for each splitline that has been moved from the possible splitline data structure to the final splitline data structure. In other words, all of the splitlines selected in STEPS 755-770 are replaced with one or more artificial edges. The artificial edges are added to the skeleton graph.

Figure 8C:
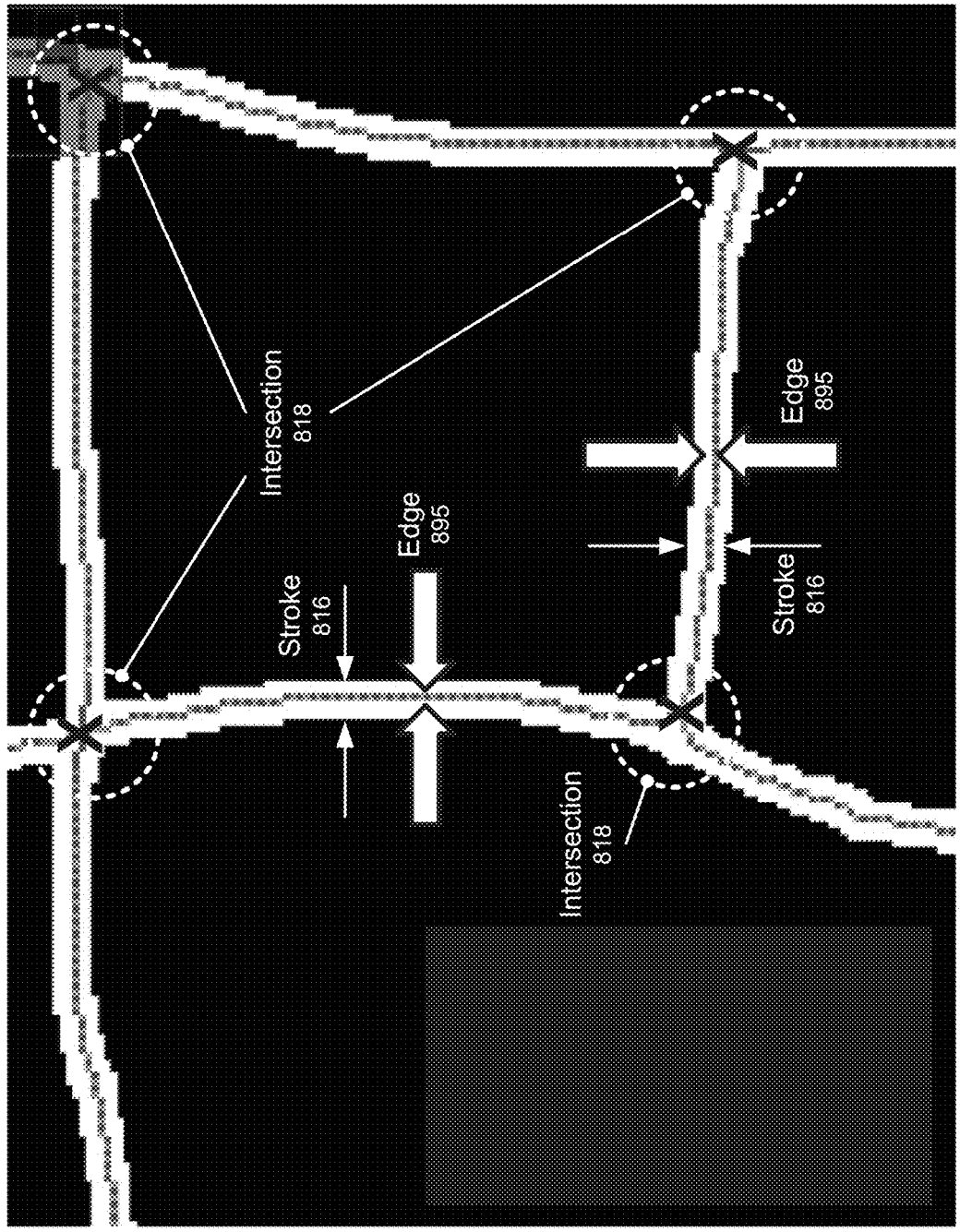

FIGS. 8A-8C show an implementation example in accordance with one or more embodiments of the invention. Specifically, FIGS. 8A-8C show an implementation example of primarily STEP 205, STEP 215, and STEP 230 of the flowchart of FIG. 2. FIG. 8A shows an image (806) with a hand-drawn table (808). Specifically, the table (808) includes hand-drawn stokes that form the rows and columns. One or more cells of the table (808) may include text. Alternatively, one or more of the cells of the table may be merged. The hand-drawn table (808) may be drawn at an angle. In other words, the table (808) is not aligned with the standard coordinate system (899) for the image (806).

FIG. 8B shows the image (810) after it has been converted to a mask. Moreover, a custom coordinate system (812) has been established. This custom coordinate system (812) has axes that are better aligned with the rows and columns of the table (808) than the standard coordinate system (899).

FIG. 8C shows a partial skeleton graph (814) for the table. As shown in FIG. 8C, the rows and columns of the table are formed by multiple hand-drawn strokes (816). The skeleton graph (814) includes a set of edges (895) and vertices that represent the hand-drawn table. Each edge (895) corresponds to a stroke (816), or a portion of a stroke, of the hand-drawn table and each vertex may correspond to an intersection (818) of two or more edges (895). In other words, the edges (895) are separated by the vertices. Further, each edge (895) contains a path of pixels from one end of the stroke (816) to the other end of the stroke (816), located approximately at the center of the stroke. In FIG. 8C, the width of the path/edge is 1 pixel.

Figures 9A, 9B:
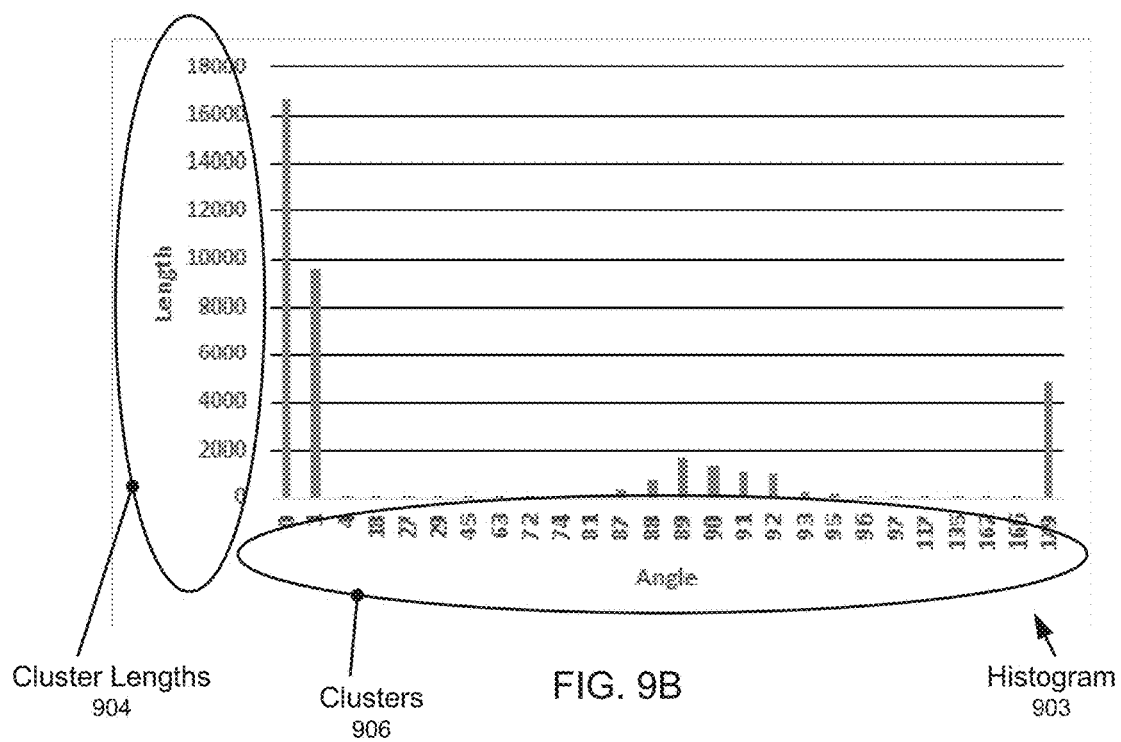
FIGS. 9A and 9B show an implementation example in accordance with one or more embodiments of the invention.

FIGS. 9A and 9B show an implementation example in accordance with one or more embodiments of the invention. Specifically, FIGS. 9A and 9B show an implementation example of the table typesetness score calculation method described above in reference to the flowchart of FIG. 3.

FIG. 9A shows the mask and skeleton graph of a hand-drawn table (902) similar to the image (810) and skeleton graph (814) of hand-drawn table (808), as discussed above in reference to FIGS. 8A-8C. The method of determining the typesetness score of a hand-drawn table, as discussed above in reference to FIG. 3, is applied to the hand-drawn table (902).

FIG. 9B shows a histogram (903) as described above in reference to FIG. 3. The histogram (903) is generated after determining the angle for each edge and the length for each edge of the skeleton graph for the hand-drawn table (902). The x-axis of the histogram (903) corresponds to the clusters (906) of edges. Specifically, each cluster has edges with the same or similar angles. The y-axis of the histogram (903) corresponds to the cluster lengths (904) for each cluster (906). As discussed above, the cluster length for a cluster is the sum of the lengths of the edges in the cluster.

Assume, for the example of FIG. 9A and FIG. 9B, that only the top two cluster lengths (i.e., N=2) are used to calculate the typesetness score for the hand-drawn table (902). As shown in FIG. 9B, the top two cluster lengths are associated with edges having angles that equal (or approximately equal) 0 or 1 degrees. The sum of these top two cluster lengths is 26,297. The total sum of the lengths of all edges from all clusters is 38,523. Accordingly, the typesetness score for the hand-drawn table (902) is 26297/38523=0.68.

Figure 10A:
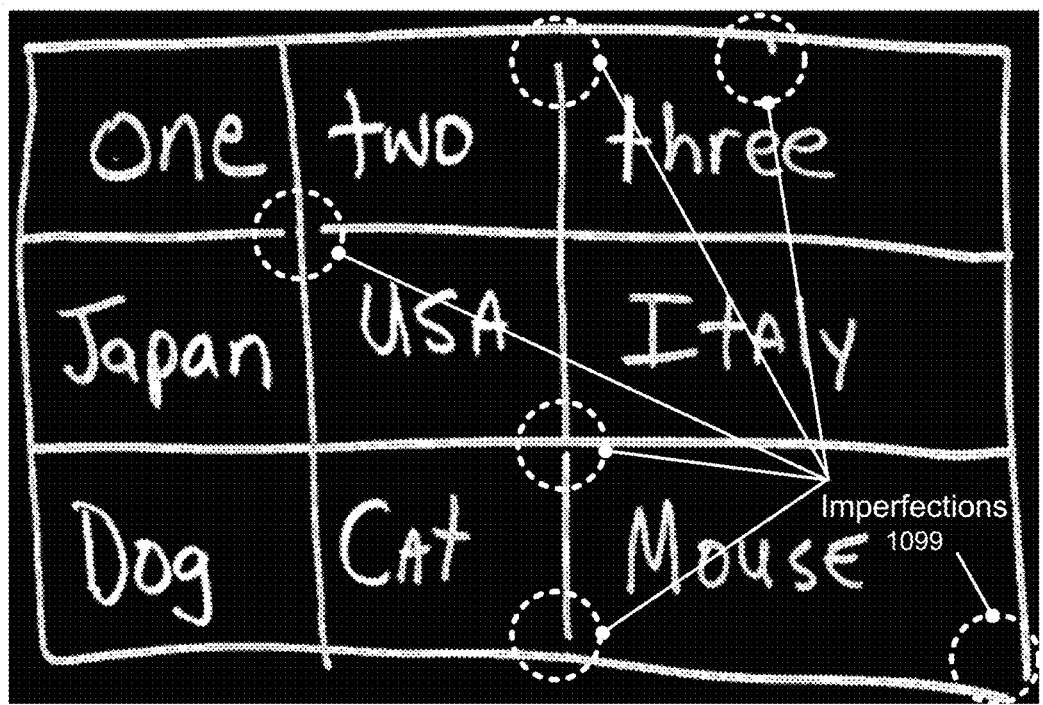
FIGS. 10A and 10B show an implementation example in accordance with one or more embodiments of the invention.
Figure 10B:
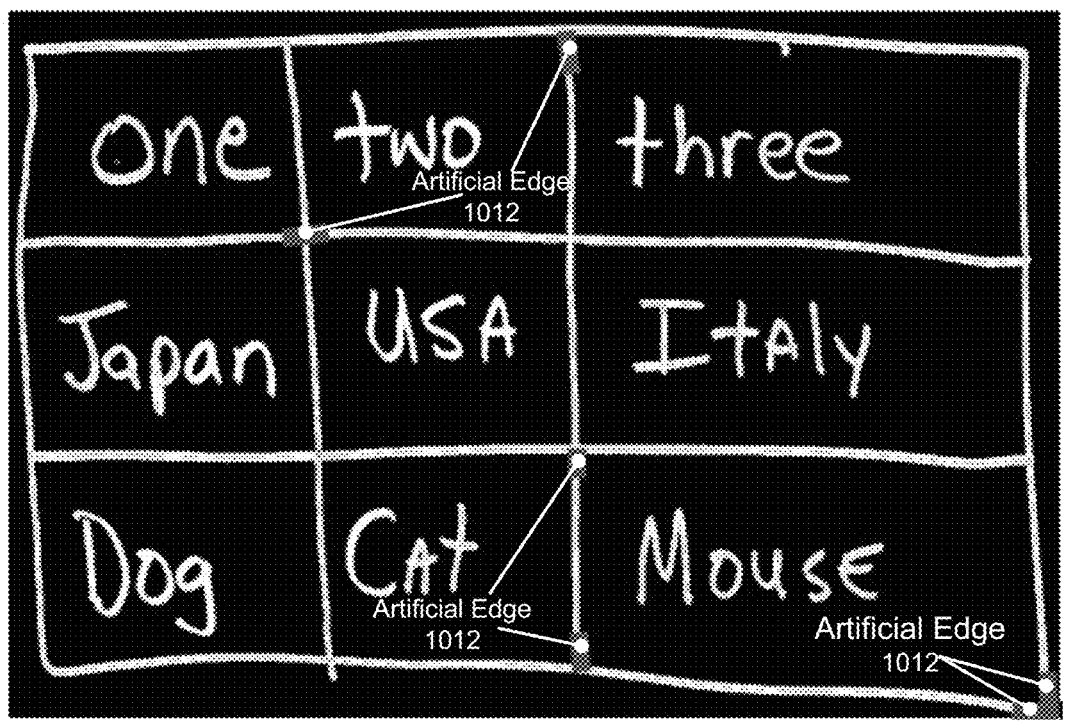

FIGS. 10A and 10B show an implementation example in accordance with one or more embodiments of the invention. Specifically, FIGS. 10A and 10B show an implementation example of the table repair method described above in reference to the flowchart of FIGS. 4A and 4B.

FIG. 10A shows the mask and skeleton for a hand-drawn table (1002) similar to the image (810) and skeleton graph (814) of hand-drawn table (808), as discussed above in reference to FIGS. 8A-8C. As seen in FIG. 10A, the hand-drawn table (1002) includes multiple imperfections (1099) that may require repairing.

In one or more embodiments of the invention, a quality threshold is used to prevent a false positive connection. Specifically, a quality score is calculated for each potential artificial edge and the quality score is compared against the quality threshold. If the quality score is below the quality threshold, the potential artificial edge is discarded (i.e., not added to the skeleton graph). The quality threshold may be adjusted based on how closely the table matches a template table. For example, for hand-drawn tables that are well-drawn, the quality threshold may be higher and vice versa. For example, the quality score may take on a range of [0, 1], and the quality threshold may be 0.82.

In one or more embodiments, not all of the imperfections (1099) will require repairing as repairing certain imperfections (1099) may result in new errors being introduced to the table. Specifically, consider a table that includes a stroke ("false stroke") that is not an actual row or column boundary (e.g., it is actually a text character, noise, etc.). Regardless, during the skeletonization process, an edge may be generated for this false stroke and the end of this edge may be classified as a terminal vertex. The quality threshold will prevent an artificial edge from being generated for this terminal vertex associated with the false stroke.

In one or more embodiments of the invention, the quality score for a collinear connection is calculated as:

quality_score=typeset_score×collinearity_score+(1−typeset_score)×gap_score.

Let dist=the distance between the terminal vertex and the position. Let len_stroke=the length of the stroke on which the terminal vertex is located. If dist≤len_stroke, then the gap_score=1. Otherwise, gap_score=max (0.0, (2*len_stroke−dist)/len_stroke).

The collinearity_score is calculated as the average of two scores (score1, score2) that assess how well: (i) the trailing direction and the connection direction (i.e., the direction of the vector connecting the terminal vertex and the position) align; and (ii) the trailing direction and the destination direction align. Let ang1=the angle in degrees between the trailing direction and the connection direction. Then, score1=max(0.0, (90°−ang1)/90°). Let ang2=the angle in degrees between the trailing direction and the destination direction. Then, score2=max (0.0, (90°−ang2)/90°). Finally, the collinearity_score=(score1+score2)/2.

In one or more embodiments of the invention, in the case of a terminal vertex at the end of an unconnected edge, the trailing direction is the direction of the vector pointing from the Nth pixel before the end pixel to the end pixel on the edge's path of pixels. For example, N=5. Other values of N are also possible. In the case of a terminal vertex that corresponds to a T-intersection, the trailing direction is the direction of the vector that points to the pixel(s) at the intersection of the three edges, and starts on the stem of the T-intersection k pixels away from the intersection of the three edges on the edge's path of pixels. For example, k=5. Other values of k are also possible.

In one or more embodiments of the invention, the destination direction is the direction of the edge at the position away from the terminal vertex. This can be computed as the vector from the position to a location on the edge q pixels away from the position in the direction away from the terminal vertex. For example, q=5. Other values of q are also possible.

In one or more embodiments of the invention, the quality score for a perpendicular connection is calculated as:

quality_score=typeset_score×perpendicularity_score+
(1−typeset_score)×gap_score.

Let dist=the distance between the terminal vertex and the position. Let len_stroke=the length of the stroke on which the terminal vertex is located. If dist≤len_stroke, then the gap_score=1. Otherwise, gap_score=max (0.0, (2*len_stroke−dist)/len_stroke).

The perpendicularity_score reflects how closely the angle between the trailing direction and the destination direction resembles a right angle. Let ang=the angle in degrees between the trailing direction and the destination direction. If ang<90°, then the perpendicularity_score=ang/90°. If ang≥90°, then the perpendicularity_score=(180°−ang)/90°).

FIG. 10B shows the hand-drawn table (1002) once the table repairing process has been completed. As seen in FIG. 10B, multiple artificial edges (1012) have been generated and added to the skeleton graph to remove the imperfections. Specifically, the number of terminal vertices has been reduced. The table (1002) shown in FIG. 10B is more suitable for further processing, including processes that attempt to generate a high-level representation of the table for inclusion in an electronic document (e.g., OOXML document, PDF document).

Figures 11A, 11B, 11C:
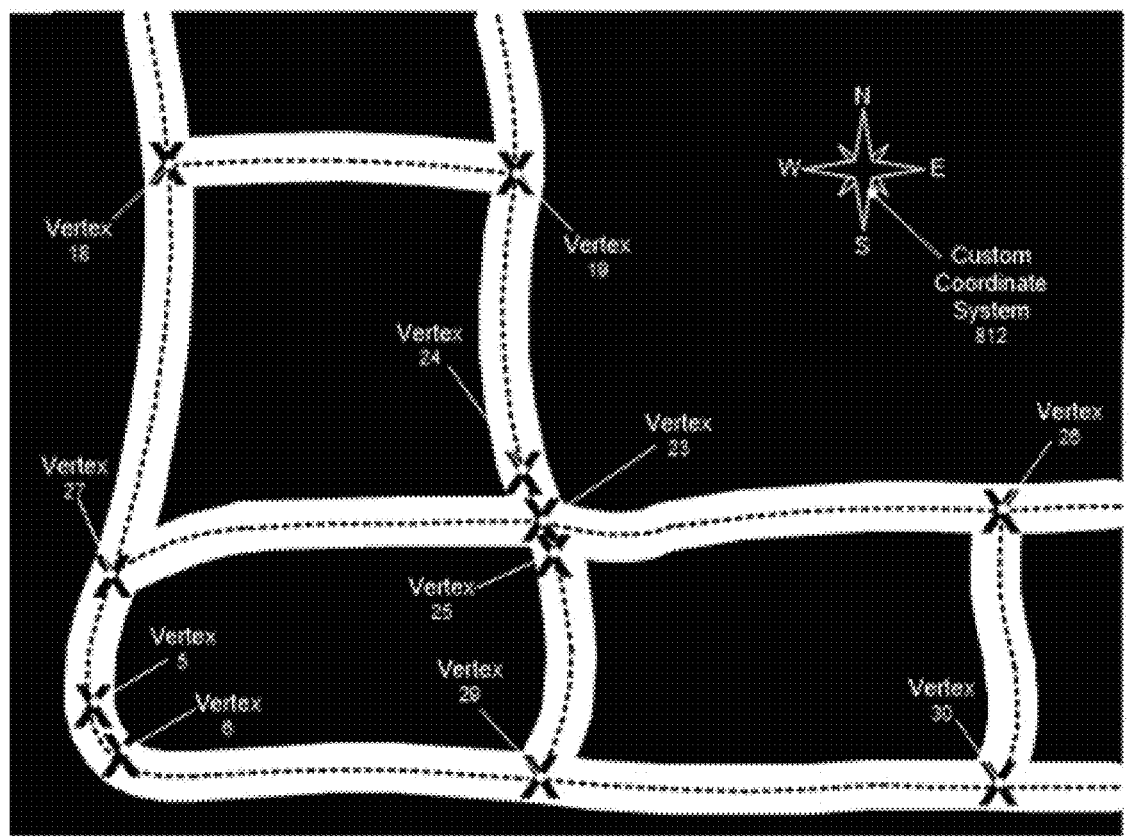
FIGS. 11A-11C show an implementation example in accordance with one or more embodiments of the invention.

FIGS. 11A-11C show an implementation example in accordance with one or more embodiments of the invention. Specifically, FIGS. 11A-11C show an implementation example of the table cell detection method described above in reference to the flowchart of FIGS. 5A-5C.

FIG. 11A shows a partial mask and skeleton graph of a hand-drawn table (1102) similar to the image (810) and skeleton graph (814) of hand-drawn table (808), as discussed above in reference to FIGS. 8A-8C. The custom coordinate system (812), as discussed in reference to FIGS. 8A-8C, has been established for the hand-drawn table (1102). As seen in FIG. 11A, the skeleton graph of the hand-drawn table (1102) includes multiple vertices (5, 6, 18, 19, 23, 24, 25, 26, 27, 29, 30). Assume vertex (27) is selected as the corner vertex. Accordingly, vertex (23) is the starting vertex and vertex (5) is the ending vertex. Each of the starting vertex (i.e., vertex (23)) and the ending vertex (i.e., vertex (5)) is separated from the corner vertex (i.e., vertex (27)) by a single edge. Moreover, the direction of the edge from vertex (27) to vertex (23) is EAST, while the direction of the edge from vertex (5) to vertex (27) is NORTH (i.e., the two edges are perpendicular or approximately perpendicular). This is an example of STEP 510 discussed above.

FIG. 11B shows an example of a visited vertices (VV) data structure (1103) after being populated with all vertices that make up a route for a cell in the table for the examples discussed in FIG. 11A where the selected corner vertex is vertex (27). As seen in FIG. 11A, the vertex (6), which is the vertex adjacent to the ending vertex (5), is the last vertex to be stored in the VV data structure (1103).

FIG. 11C shows an example of a cameFrom (CF) data structure (1105) that includes all of the vertices that were explored to generate a route for a cell in the table for the examples discussed in FIGS. 11A and 11B where the selected corner vertex is vertex (27). As seen in FIG. 11C, each entry in the cameFrom (CF) data structure (1105) includes a vertex and the vertex that directly precedes the vertex in a counter clockwise direction on the skeleton graph. Furthermore, the preceding vertex for vertex (5) is set as itself to indicate that vertex (5) is the ending vertex.

Figure 12A:
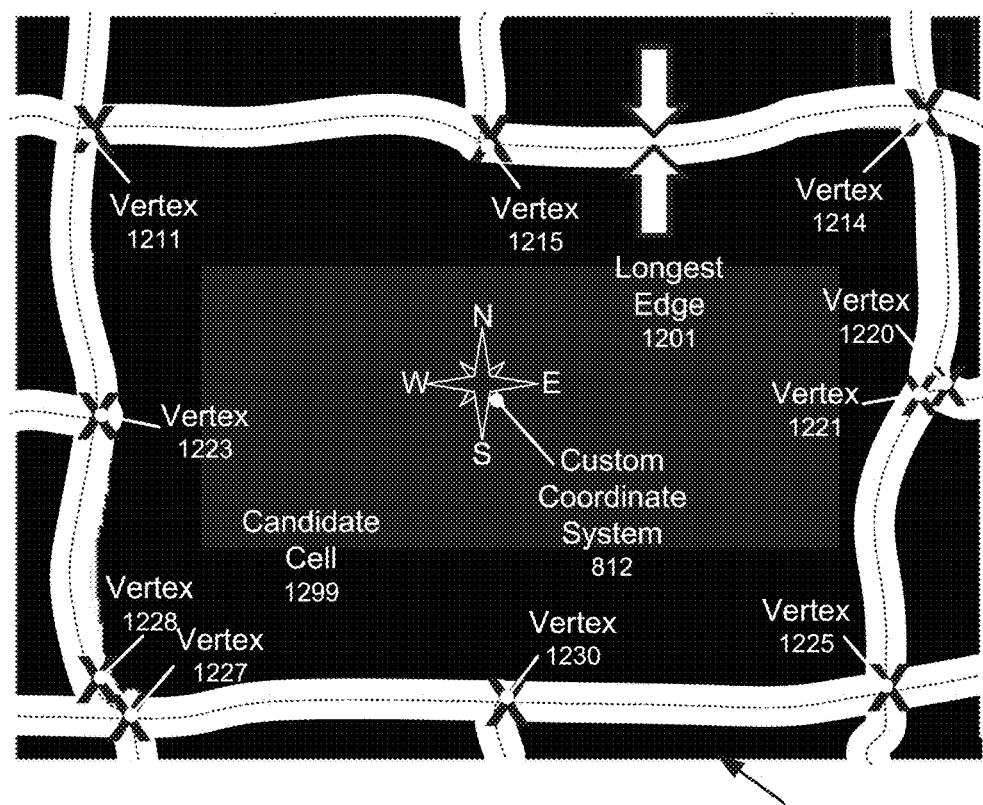
FIGS. 12A and 12B show an implementation example in accordance with one or more embodiments of the invention.
Figure 12B:
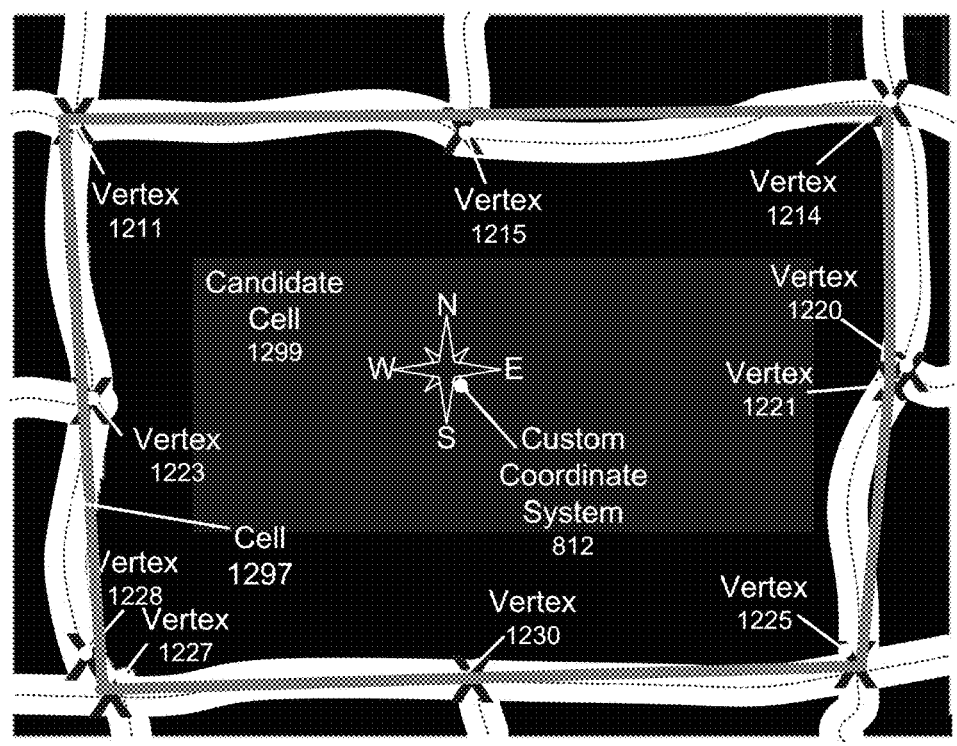

FIGS. 12A and 12B show an implementation example in accordance with one or more embodiments of the invention. Specifically, FIGS. 12A and 12B show an implementation example of the table cell validation method described above in reference to the flowchart of FIGS. 6A-6C.

FIGS. 12A and 12B show a partial mask and skeleton graph of a hand-drawn table (1202) similar to the image (810) and skeleton graph (814) of hand-drawn table (808), as discussed above in reference to FIGS. 8A-8C. The custom coordinate system (812), as discussed in reference to FIGS. 8A-8C, has been established for the hand-drawn table (1202).

As seen in FIG. 12A, the skeleton graph of the hand-drawn table (1202) includes multiple vertices (1211, 1214, 1215, 1220, 1221, 1223, 1225, 1227, 1228, 1230) that separate a set of edges that form a candidate cell (1299) of the hand-drawn table (1202). The longest edge (1201) is the edge between vertex (1215) and vertex (1214) and the longest edge (1201) has an orientation of NORTH. As seen in FIG. 12A, the candidate cell (1299) includes a cardinality of 10 edges.

In one or more embodiments of the invention, after the table cell validation method as described above in FIGS. 6A-6C has been applied to the multiple vertices (1211, 1214, 1215, 1220, 1221, 1223, 1225, 1227, 1228, 1230) that separate a set of edges that form a candidate cell (1299) as shown in FIG. 12A, the candidate cell (1299) is accepted as a near-rectangular cell of the hand-drawn table (1202) and illustrated as cell (1297) (i.e., cell formed by the edges illustrated by grey lines) in the hand-drawn table (1202) of FIG. 12B.

Figure 13:
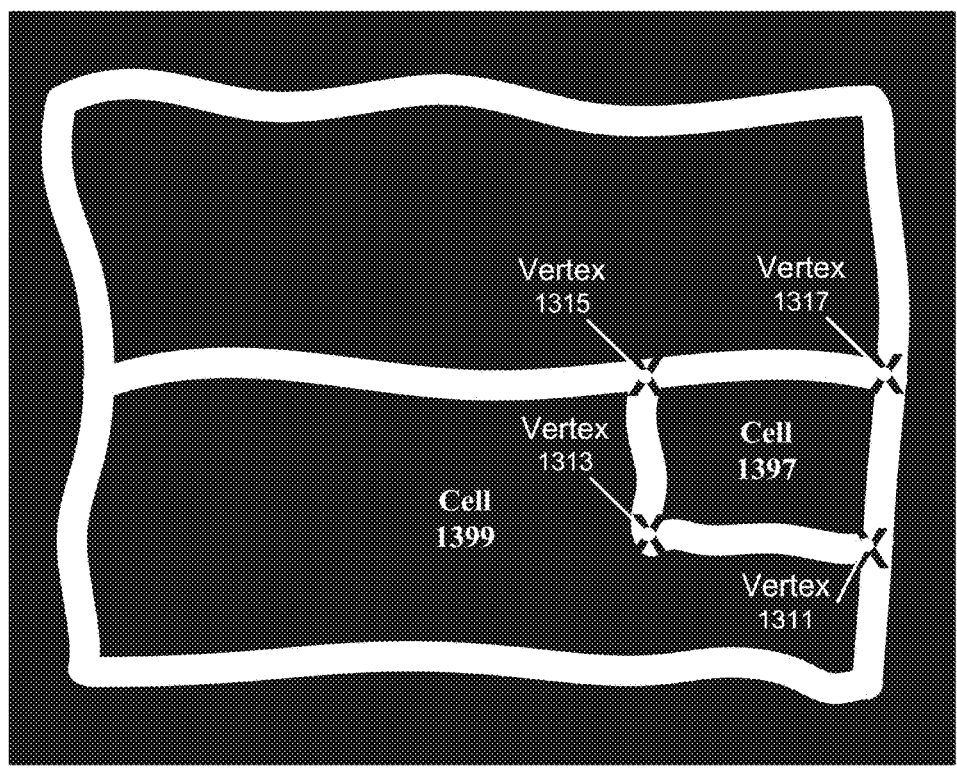
FIG. 13 shows an implementation example in accordance with one or more embodiments of the invention.

FIG. 13 shows an implementation example in accordance with one or more embodiments of the invention. Specifically, FIG. 13 shows an implementation example of the interior cell identification and removal method described above in reference to FIG. 1 and STEP 240 of the flowchart in FIG. 2.

FIG. 13 shows the mask and an abstraction of the skeleton graph of a hand-drawn table (1302) similar to the image (810) and skeleton graph (814) of hand-drawn table (808), as discussed above in reference to FIGS. 8A-8C. As seen in FIG. 13, cell (1399) shares a common edge between vertex (1315) and vertex (1317) with cell (1397). Furthermore, cell (1397) overlaps with cell (1399) and has a smaller size (i.e., area) than cell (1399) (i.e., cell (1397) is wholly contained within cell (1399)). Therefore, cell (1397) is identified as an interior cell of cell (1399) and removed from the skeleton graph.

Figure 14:
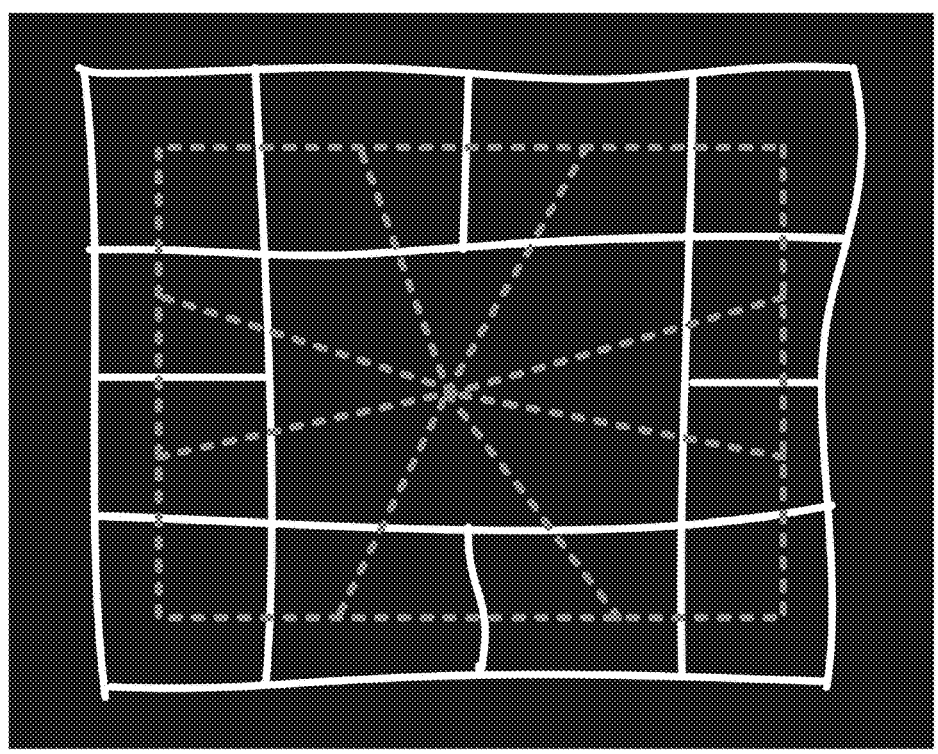
FIG. 14 shows an implementation example in accordance with one or more embodiments of the invention.

FIG. 14 shows an implementation example in accordance with one or more embodiments of the invention. Specifically, FIG. 14 shows the cell linking method described above in reference to FIG. 1 and STEP 245 of the flowchart in FIG. 2.

FIG. 14 shows the mask and an abstraction of the skeleton graph of a hand-drawn table (1402) similar to the image (810) and skeleton graph (814) of hand-drawn table (808), as discussed above in reference to FIGS. 8A-8C. As seen in FIG. 14, a link (illustrated by the broken grey lines) is established for all of the cells of the table (illustrated by the solid white line). The link (illustrated by the broken grey lines) establishes the relationship of each cell (i.e., illustrates how each cell is connected to another cell) of the table (illustrated by the solid white line).

Figure 15A:
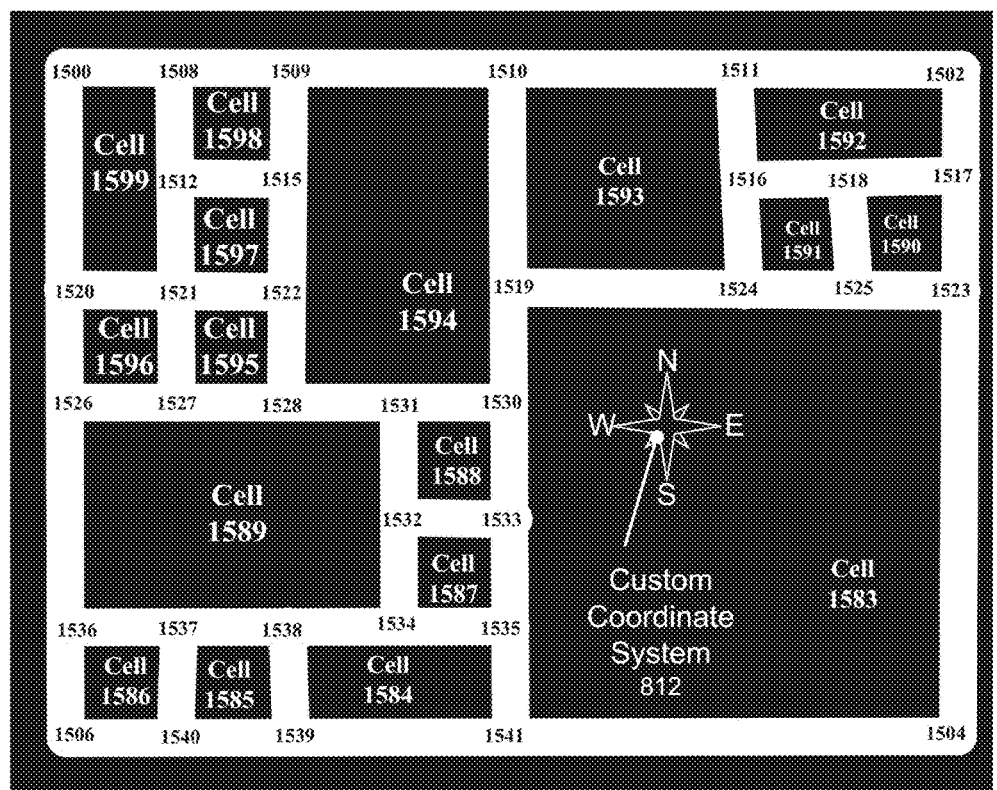
FIGS. 15A and 15B show an implementation example in accordance with one or more embodiments of the invention.
Figure 15B:
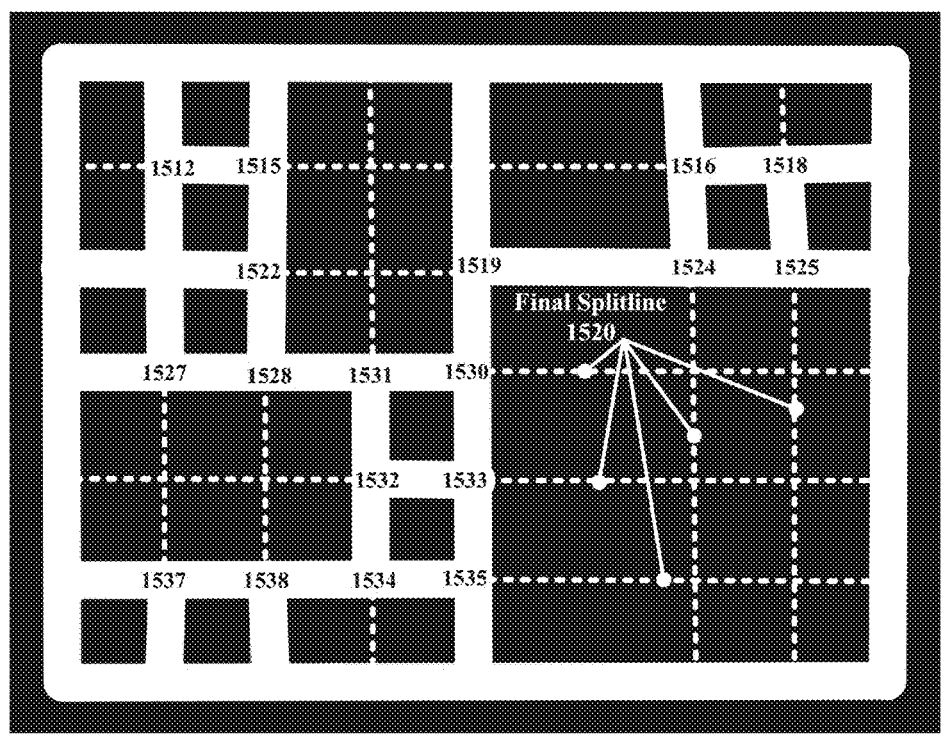

FIGS. 15A and 15B show an implementation example in accordance with one or more embodiments of the invention. Specifically, FIGS. 15A and 15B show an implementation example of the merged cell splitting method described above in reference to the flowchart of FIGS. 7A-7C.

FIG. 15A shows the mask and an abstraction of the skeleton graph of a hand-drawn table (1502) similar to the image (810) and skeleton graph (814) of hand-drawn table (808), as discussed above in reference to FIGS. 8A-8C. As seen in FIG. 15A, the hand-drawn table (1502) includes multiple cells (1583-1599) with vertices (1500-1541) identified on the borders (i.e., edges) of the cells. Certain cells (1583, 1584, 1589, 1592, 1593, 1594, 1599) are merged cells that include one or more of the actual cells of the hand-drawn table (1502).

In one or more embodiments of the invention, the custom coordinate system (812) is aligned with the vertical and horizontal axes of the hand-drawn table (1502).

FIG. 15B shows the hand-drawn table (1502) overlaid with the final splitlines (1520) generated by the merged cell splitting method for all four cardinal directions (i.e., north, east, south, west). Additional final splitlines are also shown in FIG. 15B, but not labelled. All of the final splitlines will be replaced with one or more artificial edges that will be added to the skeleton graph to generate a corrected high-level representation of the hand-drawn table (1502).

Figure 16A:
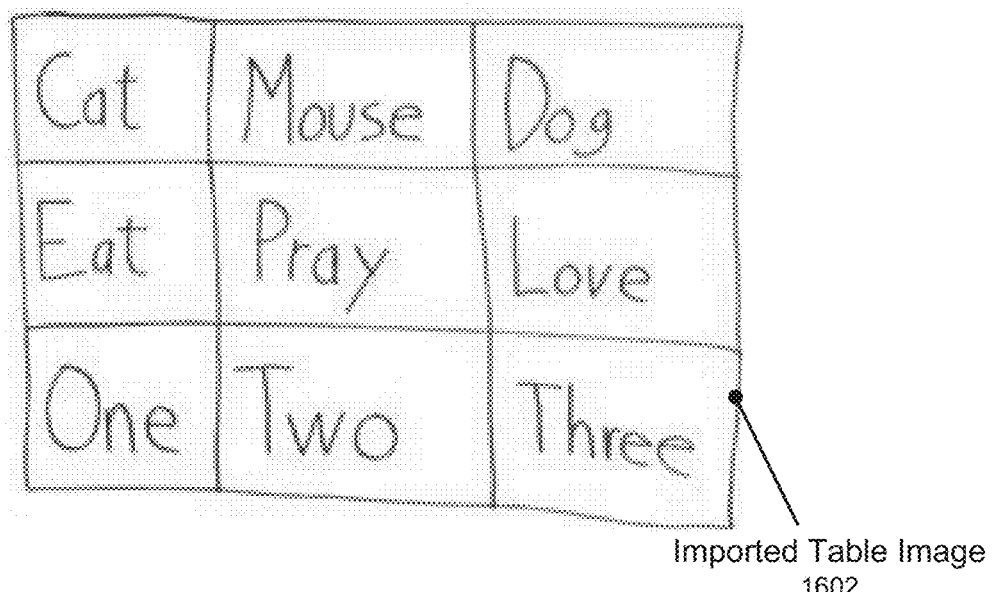
FIGS. 16A and 16B show an implementation example in accordance with one or more embodiments of the invention.
Figure 16B:
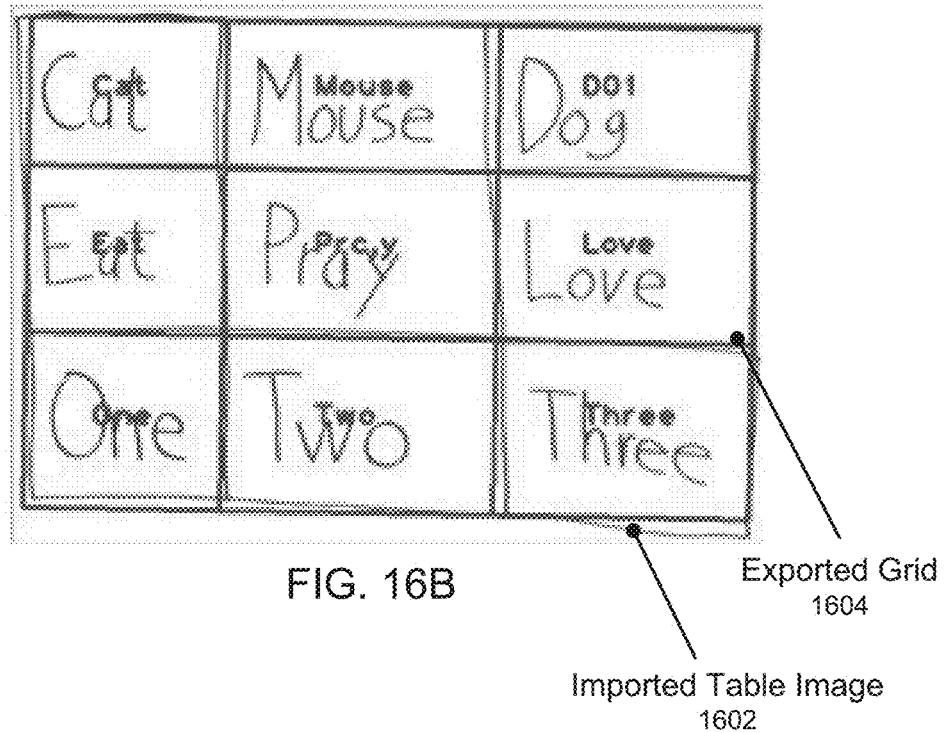

FIGS. 16A and 16B show an implementation example in accordance with one or more embodiments of the invention. Specifically, FIGS. 16A and 16B show the generation and exporting of the grid of cells described above in reference to FIG. 1 and STEP 255 of the flowchart of FIG. 2.

FIG. 16A shows an imported table image (1602). As seen in FIG. 16A, the imported table image (1602) is a hand-drawn table with rows and columns that are not perfectly straight. Furthermore, the imported table image (1602) includes a plurality of text and/or characters in each cell of the table.

FIG. 16B shows an exported grid (1604) generated for the imported table image (1602) after the table detection method of one or more embodiments as described above in FIGS. 1-15 has been applied to the imported table image (1602). As seen in FIG. 16B, the cells that make up the exported grid (1604) match the rows and columns of the imported table image (1602) and therefore, the exported grid (1604) correctly represents a high-level representation of the imported table image (1602). As further seen in FIG. 16B, once the exported grid (1604) has been generated, a text/character recognition is executed on the imported table image (1602) to identify the original texts and/or characters included in the imported table image (1602)

Figure 17:
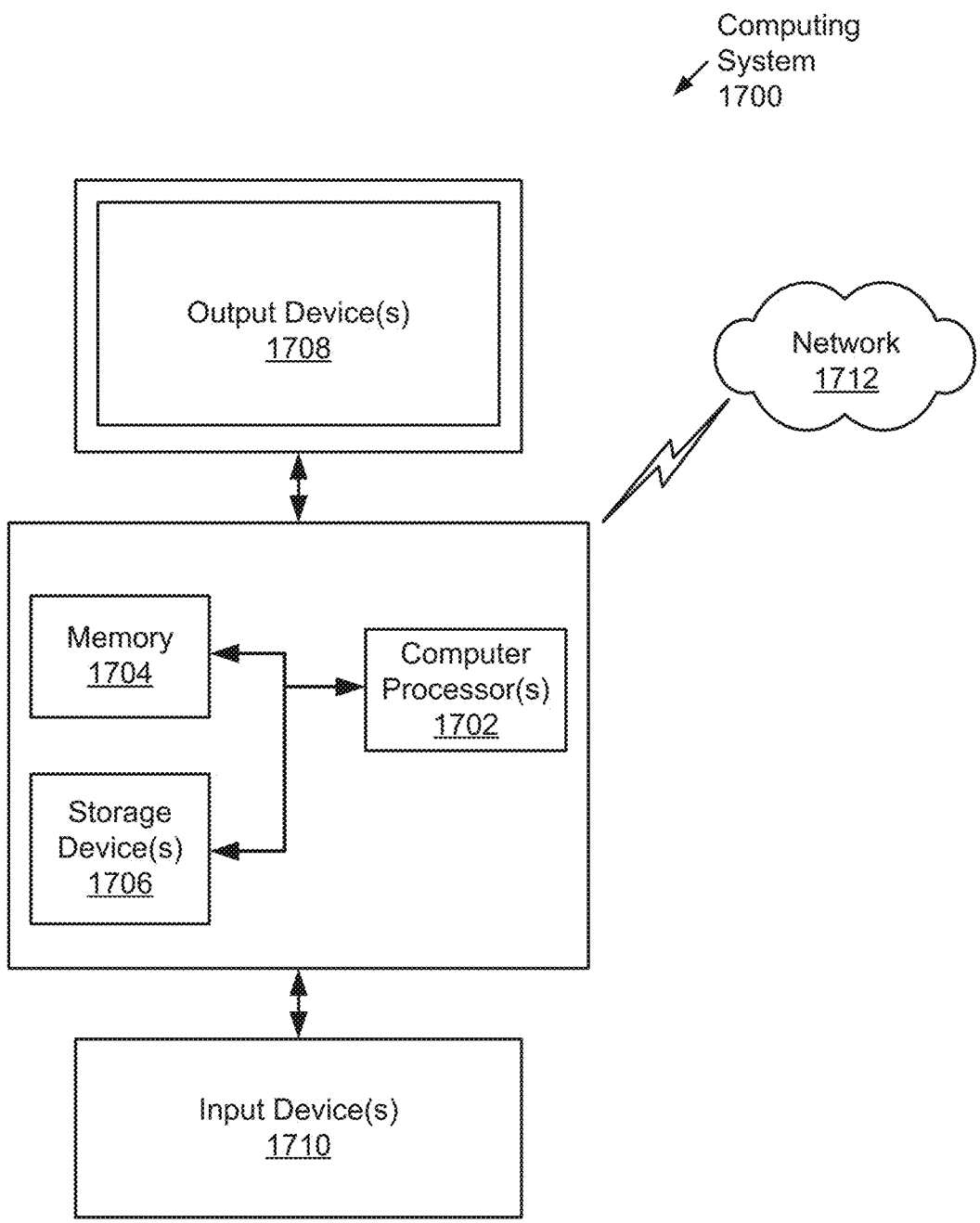
FIG. 17 shows a computing system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 17, the computing system (1700) may include one or more computer processor(s) (1702), associated memory (1704) (e.g., random access memory (RAM), cache memory, flash memory, etc.), one or more storage device(s) (1706) (e.g., a hard disk, an optical drive such as a compact disk (CD) drive or digital versatile disk (DVD) drive, a flash memory stick, etc.), and numerous other elements and functionalities. The computer processor(s) (1702) may be an integrated circuit for processing instructions. For example, the computer processor(s) may be one or more cores, or micro-cores of a processor. The computing system (1700) may also include one or more input device(s) (1710), such as a touchscreen, keyboard, mouse, microphone, touchpad, electronic pen, or any other type of input device. Further, the computing system (1700) may include one or more output device(s) (1708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (1700) may be connected to a network (1712) (e.g., a local area network (LAN), a wide area network (WAN) such as the Internet, mobile network, or any other type of network) via a network interface connection (not shown). The input and output device(s) may be locally or remotely (e.g., via the network (1712)) connected to the computer processor(s) (1702), memory (1704), and storage device(s) (1706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (1700) may be located at a remote location and be connected to the other elements over a network (1712). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing an image comprising a table, comprising:
    identifying, by finding a series of connected pixels, a plurality of connected components in the image that form an entirety of the table including rows, columns, and content of the table, wherein the connected components are made up of the series of connected pixels;
    generating, for the table, a skeleton graph comprising a plurality of edges based on all of the plurality of connected components;
    calculating a typesetness score that compares the table to a template table based on the plurality of edges;
    determining a rotation angle for the table and generating a custom coordinate system for the table based on the rotation angle;
    identifying a plurality of cells in the table using all of the skeleton graph, the typesetness score, and the custom coordinate system;
    determining a size of each of the plurality of cells based on a length of the plurality of edges;
    identifying interior cells in the table based on the size of each of the plurality of cells, edges shared by the plurality of cells in a predetermined direction, and an overlap in area between the plurality of cells;
    removing the interior cells from the plurality of cells;
    linking adjacent cells of the plurality of cells based on a common edge of the plurality of edges and validating a link between the adjacent cells;
    generating a grid of cells based on the link between the adjacent cells and comprising the plurality of cells;
    exporting the grid as a high-level representation of the table.

2. The method of claim 1, wherein calculating the typesetness score comprises:
    identifying a plurality of angles and a plurality of lengths for the plurality of edges;
    grouping the plurality of edges into a plurality of clusters based on the plurality of angles;
    calculating a plurality of cluster lengths for the plurality of clusters based on the plurality of lengths;
    selecting a subset of the plurality of cluster lengths; and
    calculating a ratio of a sum of the subset to a sum of the plurality of lengths.

3. The method of claim 1, further comprising:
    identifying a terminal vertex on the plurality of edges;
    generating a region of interest for the terminal vertex;
    determining a target within the region of interest; and
    repairing the table, before identifying the plurality of cells, by adding an artificial edge between the terminal vertex and the target to the skeleton graph.

4. The method of claim 1, wherein determining the plurality of cells in the table comprises:
    identifying, in the skeleton graph, a corner vertex, a starting vertex adjacent to the corner vertex, and an ending vertex adjacent to the corner vertex;
    calculating a travel direction from the corner vertex to the starting vertex;
    determining a set of route options for the starting vertex comprising:
        a first set of vertices adjacent to the starting vertex in the skeleton graph;
        a set of travel directions from the starting vertex to the first set of vertices; and
        a set of turn costs for the first set of vertices based on the set of travel directions and a perpendicular of the travel direction from the corner vertex to the starting vertex;
    selecting a candidate vertex from the first set of vertices as a first vertex based on the set of turn costs;
    determining a set of route options for a second vertex comprising a second set of vertices adjacent to the second vertex in the skeleton graph;
    determining the second set of vertices comprises the ending vertex; and
    generating a route for a cell candidate comprising the corner vertex, the starting vertex, the first vertex, the second vertex, and the ending vertex.

5. The method of claim 4, further comprising:
    obtaining a set of edges among of the plurality of edges associated with the cell candidate;
    determining a longest edge in the set of edges and a first orientation of the longest edge;
    determining, in the set of edges, an initial edge for a first cell border comprising the first orientation and the longest edge;
    building the first cell border based on the initial edge, the first orientation, and the set of edges;
    calculating a second orientation for a second cell border by rotating the first orientation;
    building the second cell border based on an initial edge for the second cell border and the second orientation; and
    validating the cell candidate as a cell of the table in response to building the first cell border and building the second cell border.

6. The method of claim 1, wherein
    the linking of the adjacent cells comprises:
        identifying the common edge shared between two cells of the plurality of cells in a first direction of the custom coordinate system; and
        recording the two cells as a set of neighboring cells; and
    the validating of the link between the adjacent cells comprises:
        setting a cell from the set of neighboring cells as a current cell and a remaining cell from the set of neighboring cells as a neighbor cell;
        confirming that the neighbor cell is a cell candidate among the plurality of cells identified in the table; and
        confirming that the current cell and the neighbor cell are part of the same set of neighboring cells.

7. The method of claim 1, wherein each cell in the plurality of cells comprises a first border, a second border opposite the first border, a third border, and a fourth border opposite the third border, and
    wherein the method further comprises:
        identifying, on the skeleton graph with a plurality of vertices generated for the table, a non-corner vertex on the first border of a cell of the plurality of cells;
        determining a plurality of splitlines extending from the non-corner vertex and intersecting with the second border of the cell without intersecting with the third or fourth border of the cell;
        calculating a plurality of confidence values for the plurality of splitlines; and splitting the cell by generating an artificial edge, based on the plurality of confidence values and a splitline of the plurality of splitlines.

8. The method of claim 1, wherein the grid is a largest quadrilateral shape formed by and comprising the plurality of cell candidates that are linked.

9. The method of claim 1, wherein the image comprises a writing board, and wherein the table is hand-drawn on the writing board with a marker.

10. A non-transitory computer readable medium (CRM) storing computer readable program code for processing an image comprising a table embodied therein that:
identifies, by finding a series of connected pixels, a plurality of connected components in the image that form an entirety of the table including rows, columns, and content of the table, wherein the connected components are made up of the series of connected pixels;
generates, for the entirety of the table, a skeleton graph comprising a plurality of edges based on all of the plurality of connected components;
calculates a typesetness score that compares the table to a template table based on the plurality of edges;
determines a rotation angle for the table and generates a custom coordinate system for the table based on the rotation angle;
identifies a plurality of cells in the table using all of the skeleton graph, the typesetness score, and the custom coordinate system;
determines a size of each of the plurality of cells based on a length of the plurality of edges;
identifies interior cells in the table based on the size of each of the plurality of cells, edges shared by the plurality of cells in a predetermined direction, and an overlap in area between the plurality of cells;
removes the interior cells from the plurality of cells;
links adjacent cells of the plurality of cells based on a common edge of the plurality of edges and validates a link between the adjacent cells;
generates a grid of cells based on the link between the adjacent cells and comprising the plurality of cells;
exports the grid as a high-level representation of the table.

11. The non-transitory CRM of claim 10, wherein calculating the typesetness score comprises:
identifying a plurality of angles and a plurality of lengths for the plurality of edges;
grouping the plurality of edges into a plurality of clusters based on the plurality of angles;
calculating a plurality of cluster lengths for the plurality of clusters based on the plurality of lengths;
selecting a subset of the plurality of cluster lengths; and
calculating a ratio of a sum of the subset to a sum of the plurality of lengths.

12. The non-transitory CRM of claim 10, further storing computer readable program code for processing an image comprising a table embodied therein that:
identifies a terminal vertex on the plurality of edges;
generates a region of interest for the terminal vertex;
determines a target within the region of interest; and
repairs the table, before identifying the plurality of cells, by adding an artificial edge between the terminal vertex and the target to the skeleton graph.

13. The non-transitory CRM of claim 10, wherein determining the plurality of cells in the table comprises:
identifying, in the skeleton graph, a corner vertex, a starting vertex adjacent to the corner vertex, and an ending vertex adjacent to the corner vertex;
calculating a travel direction from the corner vertex to the starting vertex;
determining a set of route options for the starting vertex comprising:
a first set of vertices adjacent to the starting vertex in the skeleton graph;
a set of travel directions from the starting vertex to the first set of vertices; and
a set of turn costs for the first set of vertices based on the set of travel directions and a perpendicular of the travel direction from the corner vertex to the starting vertex;
selecting a candidate vertex from the first set of vertices as a first vertex based on the set of turn costs;
determining a set of route options for a second vertex comprising a second set of vertices adjacent to the second vertex in the skeleton graph;
determining the second set of vertices comprises the ending vertex; and
generating a route for a cell candidate comprising the corner vertex, the starting vertex, the first vertex, the second vertex, and the ending vertex.

14. The non-transitory CRM of claim 10, wherein
the grid is a largest quadrilateral shape formed by and comprising the plurality of cell candidates that are linked, and
the image comprises a writing board, and wherein the table is hand-drawn on the writing board with a marker.

15. A system for processing an image comprising a table, comprising:
a memory;
a computer processor connected to the memory that:
identifies, by finding a series of connected pixels, a plurality of connected components in the image that form an entirety of the table including rows, columns, and content of the table, wherein the connected components are made up of the series of connected pixels;
generates, for the entirety of the table, a skeleton graph comprising a plurality of edges based on all of the plurality of connected components;
calculates a typesetness score that compares the table to a template table based on the plurality of edges;
determines a rotation angle for the table and generates a custom coordinate system for the table based on the rotation angle;
identifies a plurality of cells in the table using all of the skeleton graph, the typesetness score, and the custom coordinate system;
determines a size of each of the plurality of cells based on a length of the plurality of edges;
identifies interior cells in the table based on the size of each of the plurality of cells, edges shared by the plurality of cells in a predetermined direction, and an overlap in area between the plurality of cells;
removes the interior cells from the plurality of cells;
links adjacent cells of the plurality of cells based on a common edge of the plurality of edges and validates a link between the adjacent cells;
generates a grid of cells based on the link between the adjacent cells and comprising the plurality of cells;
exports the grid as a high-level representation of the table.

16. The system according to claim 15, wherein calculating the typesetness score comprises:
identifying a plurality of angles and a plurality of lengths for the plurality of edges;

grouping the plurality of edges into a plurality of clusters based on the plurality of angles;

calculating a plurality of cluster lengths for the plurality of clusters based on the plurality of lengths;

selecting a subset of the plurality of cluster lengths; and calculating a ratio of a sum of the subset to a sum of the plurality of lengths.

17. The system of claim 15, wherein the processor further:

identifies a terminal vertex on the plurality of edges;

generates a region of interest for the terminal vertex;

determines a target within the region of interest; and repairs the table, before identifying the plurality of cells, by adding an artificial edge between the terminal vertex and the target to the skeleton graph.

18. The system of claim 15, wherein determining the plurality of cells in the table comprises:

identifying, in the skeleton graph, a corner vertex, a starting vertex adjacent to the corner vertex, and an ending vertex adjacent to the corner vertex;

calculating a travel direction from the corner vertex to the starting vertex;

determining a set of route options for the starting vertex comprising:

a first set of vertices adjacent to the starting vertex in the skeleton graph;

a set of travel directions from the starting vertex to the first set of vertices; and a set of turn costs for the first set of vertices based on the set of travel directions and a perpendicular of the travel direction from the corner vertex to the starting vertex;

selecting a candidate vertex from the first set of vertices as a first vertex based on the set of turn costs;

determining a set of route options for a second vertex comprising a second set of vertices adjacent to the second vertex in the skeleton graph;

determining the second set of vertices comprises the ending vertex; and generating a route for a cell candidate comprising the corner vertex, the starting vertex, the first vertex, the second vertex, and the ending vertex.

19. The system of claim 15, wherein the grid is a largest quadrilateral shape formed by and comprising the plurality of cell candidates that are linked, and the image comprises a writing board, and wherein the table is hand-drawn on the writing board with a marker.

* * * * *